(12) United States Patent
Yamashita et al.

(10) Patent No.: US 10,683,918 B2
(45) Date of Patent: Jun. 16, 2020

(54) BALL SCREW DEVICE AND STEERING SYSTEM INCLUDING BALL SCREW DEVICE

(71) Applicant: JTEKT CORPORATION, Osaka-shi, Osaka (JP)

(72) Inventors: Shuhei Yamashita, Nagoya (JP); Satoshi Fujita, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 21 days.

(21) Appl. No.: 15/816,661

(22) Filed: Nov. 17, 2017

(65) Prior Publication Data

US 2018/0149245 A1    May 31, 2018

(30) Foreign Application Priority Data

Nov. 25, 2016    (JP) .................. 2016-228800

(51) Int. Cl.
*F16H 25/22* (2006.01)
*B62D 5/04* (2006.01)
*F16H 25/20* (2006.01)

(52) U.S. Cl.
CPC ....... *F16H 25/2219* (2013.01); *B62D 5/0424* (2013.01); *B62D 5/0448* (2013.01);
(Continued)

(58) Field of Classification Search
CPC ............. F16H 25/2219; F16H 25/2214; F16H 2025/2081; F16H 2025/2096; B62D 5/0424; B62D 5/0448
(Continued)

(56) References Cited

U.S. PATENT DOCUMENTS 2,851,897 A    9/1958  Cochrane
3,971,264 A    7/1976  Detraz et al.
(Continued)

FOREIGN PATENT DOCUMENTS

EP    2 218 942 A1    8/2010
EP    2 778 476 A1    9/2014
(Continued)

OTHER PUBLICATIONS

U.S. Appl. No. 15/723,702, filed Oct. 3, 2017 in the name of Yamazaki et al.
(Continued)

*Primary Examiner* — Victor L Macarthur
*Assistant Examiner* — T. Scott Fix
(74) *Attorney, Agent, or Firm* — Oliff PLC

(57) ABSTRACT

Provided is a ball screw device in which a deflector can securely be prevented from falling into a nut when the deflector is attached. A ball screw device includes a ball screw shaft, a nut, rolling elements, a ball recirculation path, and a deflector. An attachment hole has a pair of first faces. The deflector has a pair of second faces that respectively face the pair of first faces in a state in which the deflector is housed in the attachment hole. The first faces of the attachment hole and the second faces of the deflector have a locking structure in which the first faces and the second faces respectively lock each other in an improper state in which a part of the deflector is inserted into the attachment hole in a posture different from a posture of the deflector housed in the attachment hole.

13 Claims, 13 Drawing Sheets

(52) U.S. Cl.
CPC . *F16H 25/2214* (2013.01); *F16H 2025/2081* (2013.01); *F16H 2025/2096* (2013.01)

(58) Field of Classification Search
USPC .................................................. 74/424.82
See application file for complete search history.

(56) References Cited

U.S. PATENT DOCUMENTS

| | | | |
|---|---|---|---|
| 6,378,646 B1* | 4/2002 | Bugosh | B62D 5/0427 |
| | | | 180/444 |
| 6,561,053 B2* | 5/2003 | Greubel | F16H 25/2219 |
| | | | 74/424.82 |
| 6,668,672 B2* | 12/2003 | Kuo | F16H 25/2219 |
| | | | 74/424.82 |
| 7,631,572 B2* | 12/2009 | Fujita | B62D 5/0448 |
| | | | 384/43 |
| 2001/0022110 A1* | 9/2001 | Roland | F16H 25/2214 |
| | | | 74/424.87 |
| 2003/0089188 A1* | 5/2003 | Siler | F16H 25/2223 |
| | | | 74/424.82 |
| 2007/0204713 A1* | 9/2007 | Chen | F16H 25/2214 |
| | | | 74/424.86 |
| 2008/0121058 A1* | 5/2008 | Fujita | B62D 5/0448 |
| | | | 74/424.87 |
| 2008/0134822 A1* | 6/2008 | Pan | F16H 25/2214 |
| | | | 74/424.87 |
| 2010/0170360 A1 | 7/2010 | Chen et al. | |
| 2017/0187255 A1 | 6/2017 | Kanda et al. | |

FOREIGN PATENT DOCUMENTS

| | | |
|---|---|---|
| JP | 2007-078093 A | 3/2007 |
| JP | 2015-132308 A | 7/2015 |
| WO | 2016/024302 A1 | 2/2016 |

OTHER PUBLICATIONS

Feb. 23, 2018 Search Report issued in European Patent Application No. 17195468.
May 22, 2019 Office Action issued in U.S. Appl. No. 15/723,702.
Mar. 5, 2018 Search Report issued in European Patent Application No. 17203394.6.

* cited by examiner

BALL SCREW DEVICE AND STEERING SYSTEM INCLUDING BALL SCREW DEVICE

INCORPORATION BY REFERENCE

The disclosure of Japanese Patent Application No. 2016-228800 filed on Nov. 25, 2016 including the specification, drawings and abstract, is incorporated herein by reference in its entirety.

BACKGROUND OF THE INVENTION

1. Field of the Invention

The present invention relates to a ball screw device and a steering system including the ball screw device.

2. Description of the Related Art

Hitherto, there is provided an automotive steering system configured to assist actuation of a rack shaft by generating an axial thrust for the rack shaft by an electric motor (see, for example, Japanese Patent Application Publication No. 2015-132308 (JP 2015-132308 A)). In the steering system described in JP 2015-132308 A, a rotational force of the electric motor is converted to an axial thrust via a ball screw device, and the axial thrust is transmitted to the rack shaft.

The ball screw device of JP 2015-132308 A is a deflector type ball screw device. The ball screw device includes the rack shaft having a helical ball track formed on its outer peripheral surface, and a nut having a helical ball track formed on its inner peripheral surface. The ball tracks of the rack shaft and the nut are arranged so as to face each other. A ball rolling path is formed between the ball tracks. A plurality of balls are rollable along the ball rolling path.

The nut has two attachment holes passing through the nut from the ball track on the inner peripheral surface to the outer peripheral surface. Two deflectors are respectively attached to the attachment holes. A recess is formed on the outer peripheral surface of the nut. Through paths are formed through the deflectors. Each through path has one end connected to the end of the recess, and the other end open to the ball rolling path. The recess and the through paths form a ball recirculation path that bridges two predetermined positions in the ball rolling path. Thus, the balls can endlessly circulate along the ball rolling path via the ball recirculation path.

Both ends of the deflector in its longitudinal direction, which is a circumferential direction of the outer peripheral surface of the nut, are partially press-fitted and fixed to the attachment hole. Stopping surfaces are formed at the ends of the attachment hole in its longitudinal direction. The stopping surfaces are orthogonal to a direction in which the deflector is inserted into the attachment hole. When the ends of the deflector are press-fitted to the attachment hole, the stopping surfaces abut against stopped surfaces formed on the deflector, thereby positioning the deflector in a depth direction of the attachment hole. The attachment hole has a through hole between the stopping surfaces formed at both ends in the longitudinal direction. In the middle part between the press-fitting portions in the longitudinal direction, the width of the attachment hole is larger than the width (thickness) between the faces of the deflector.

When the deflector is attached to the attachment hole, for example, when the deflector is inserted into the through hole of the attachment hole in a state in which the stopped surfaces of the deflector are inclined at predetermined angles with respect to the stopping surfaces of the attachment hole, the projected length of the deflector in the longitudinal direction as viewed in the insertion direction decreases. Therefore, the stopped surfaces may fail to abut against the stopping surfaces, and therefore the deflector may fall into a radially inner portion of the nut through the wide through hole. In this case, for example, an operator needs to retrieve the deflector from the radially inner portion of the nut, and reattach the deflector to the attachment hole. Thus, the man-hour for attachment increases. As a result, the cost of the ball screw device and therefore the cost of the steering system may increase.

SUMMARY OF THE INVENTION

It is one object of the present invention to provide a ball screw device in which, when a deflector is attached to a nut, man-hour for reattachment can be reduced by securely preventing the deflector from falling into the nut, and also to provide a steering system including the ball screw device.

A ball screw device according to one aspect of the present invention includes a ball screw shaft, a nut, rolling elements, a ball recirculation path, and a deflector. The ball screw shaft has an outer peripheral ball rolling track helically formed on an outer peripheral surface. The nut is formed into a tubular shape, has an inner peripheral ball rolling track helically formed on an inner peripheral surface, and has an attachment hole passing through a portion between an outer peripheral surface and the inner peripheral surface. The rolling elements are arrayed in a rollable manner in a ball rolling path formed between the outer peripheral ball rolling track and the inner peripheral ball rolling track. The ball recirculation path bridges two predetermined points in the ball rolling path to allow the rolling elements to endlessly circulate in the ball rolling path. The deflector is fixed while being housed in the attachment hole, and includes a part or all of the ball recirculation path.

The attachment hole has a pair of first faces formed so as to face each other in an axial direction of the nut and so that an extending length in a circumferential direction of the outer peripheral surface of the nut, which is a longitudinal direction, is larger than a facing distance. The deflector has a pair of second faces that respectively face the pair of first faces in a state in which the deflector is housed in the attachment hole. The first faces of the attachment hole and the second faces of the deflector have a locking structure in which the first faces and the second faces respectively lock each other in an improper state in which a part of the deflector is inserted into the attachment hole in a posture different from a posture of the deflector housed in the attachment hole.

As described above, the first faces of the attachment hole and the second faces of the deflector have the locking structure in which the first faces and the second faces respectively lock each other in the improper state in which a part of the deflector is inserted into the attachment hole in the posture different from the posture of the deflector housed in the attachment hole. Therefore, even if the deflector is caused to fall toward the inner peripheral surface of the nut from the side of the outer peripheral surface of the nut through a through hole portion of the attachment hole, the locking structure restricts the falling of the deflector. Thus, the man-hour for reattachment is reduced, and therefore the ball screw device can be manufactured at low cost.

Another aspect of the present invention relates to a steering system including the ball screw device according to the aspect described above. Thus, it is possible to obtain a low-cost steering system including a low-cost ball screw device.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
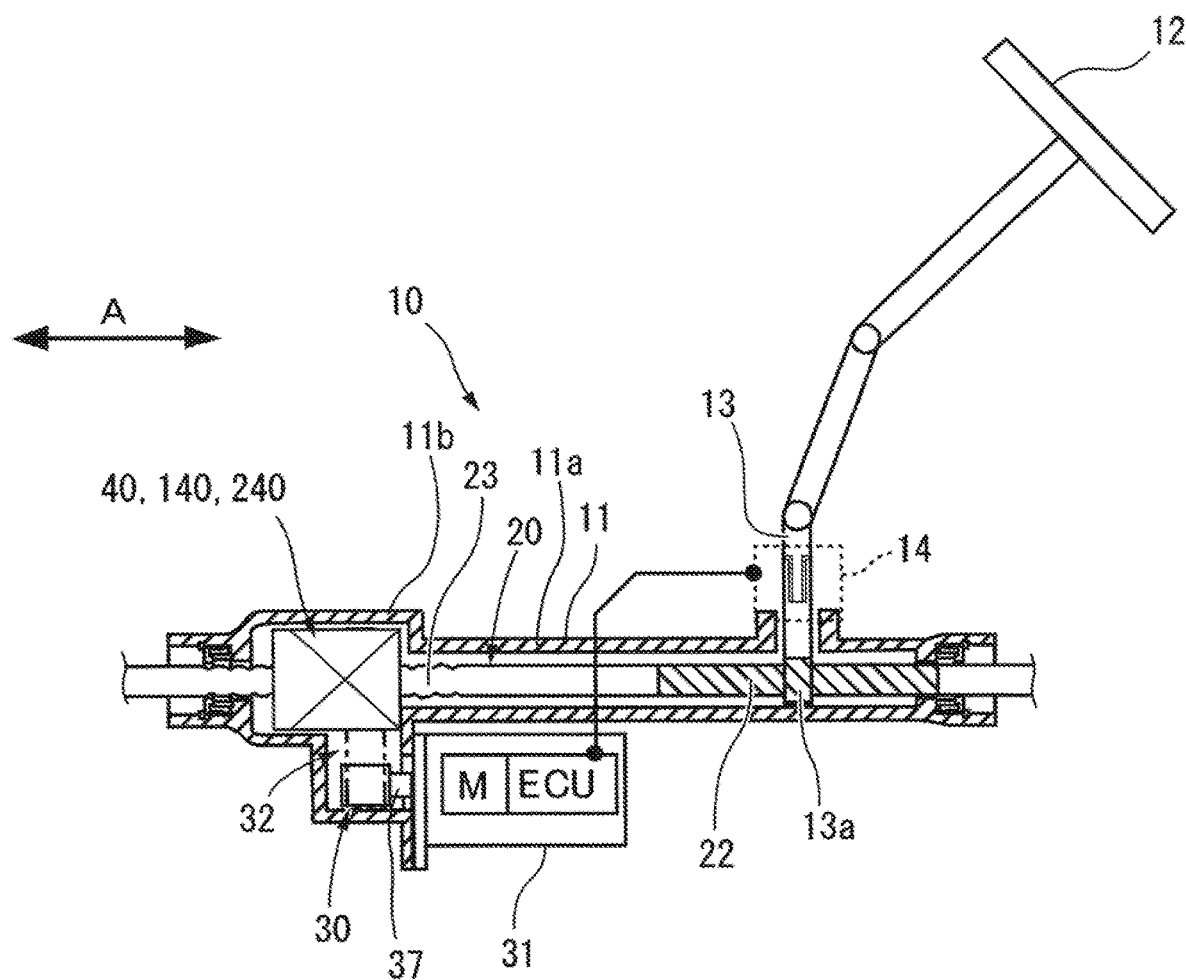
FIG. 1 is a schematic view illustrating an electric power steering system according to the present invention.

A first embodiment of the present invention is described below with reference to the drawings. FIG. 1 is an overall view illustrating an electric power steering system for a vehicle (corresponding to a steering system), for exemplifying an embodiment in which a ball screw device according to the present invention is applied to the electric power steering system.

The electric power steering system is a steering system configured to assist a steering force by a steering assist force. The ball screw device of the present invention is applicable not only to the electric power steering system but also to a four-wheel steering system, a rear-wheel steering system, a steer-by-wire system, and other various systems to which the ball screw device is applicable.

An electric power steering system 10 (hereinafter referred to as a steering system 10) is a system configured to change directions of steered wheels (not illustrated) of a vehicle by reciprocally moving a steering operation shaft 20 coupled to the steered wheels in a direction A (lateral direction in FIG. 1) that coincides with an axial direction of the steering operation shaft 20.

As illustrated in FIG. 1, the steering system 10 includes a housing 11, a steering wheel 12, a steering shaft 13, a torque detection device 14, an electric motor M (hereinafter referred to as a motor M), the steering operation shaft 20 described above, a steering assist mechanism 30, and a ball screw device 40.

The housing 11 is a fixed member that is fixed to the vehicle. The housing 11 is formed into a tubular shape, and the steering operation shaft 20 (corresponding to a ball screw shaft) is inserted through the housing 11 so as to be movable in the direction A relative to the housing 11. The housing 11 includes a first housing 11a and a second housing 11b. The second housing 11b is fixed to one end side (left side in FIG. 1) of the first housing 11a in the direction A.

The steering wheel 12 is fixed to the end of the steering shaft 13, and is rotatably supported in a vehicle cabin. The steering shaft 13 transmits, to the steering operation shaft 20, a torque applied to the steering wheel 12 through a driver's operation.

A pinion 13a constituting a rack and pinion mechanism is formed at the end of the steering shaft 13 that is located closer to the steering operation shaft 20. The torque detection device 14 detects a torque applied to the steering shaft 13 based on a torsion amount of the steering shaft 13.

The steering operation shaft 20 extends in the direction A. A rack 22 is formed on the steering operation shaft 20. The rack 22 meshes with the pinion 13a of the steering shaft 13 to constitute the rack and pinion mechanism together with the pinion 13a. In the rack and pinion mechanism, a maximum axial force transmissible between the steering shaft 13 and the steering operation shaft 20 is set based on, for example, intended use of the steering system 10.

In the steering operation shaft 20, a ball screw portion 23 is formed at a position different from that of the rack 22. The ball screw portion 23 constitutes the ball screw device 40 together with a ball nut 21 described later. The steering assist mechanism 30 transmits a steering assist force to the ball screw portion 23. Both ends of the steering operation shaft 20 are coupled to the right and left steered wheels (not illustrated) via tie rods, knuckle arms, and the like (not illustrated). The steered wheels are steered in the lateral direction through axial movement of the steering operation shaft 20 in the direction A.

The steering assist mechanism 30 is a mechanism configured to apply the steering assist force to the steering operation shaft 20 by the motor M serving as a drive source. The steering assist mechanism 30 includes the motor M, a control unit ECU, and a driving force transmission mechanism 32. The control unit ECU drives the motor M. The motor M and the control unit ECU for driving the motor M are housed in a case 31 fixed to the first housing 11a of the housing 11. The control unit ECU controls power to be output from the motor M by determining the steering assist torque based on a signal output from the torque detection device 14.

Figure 2:
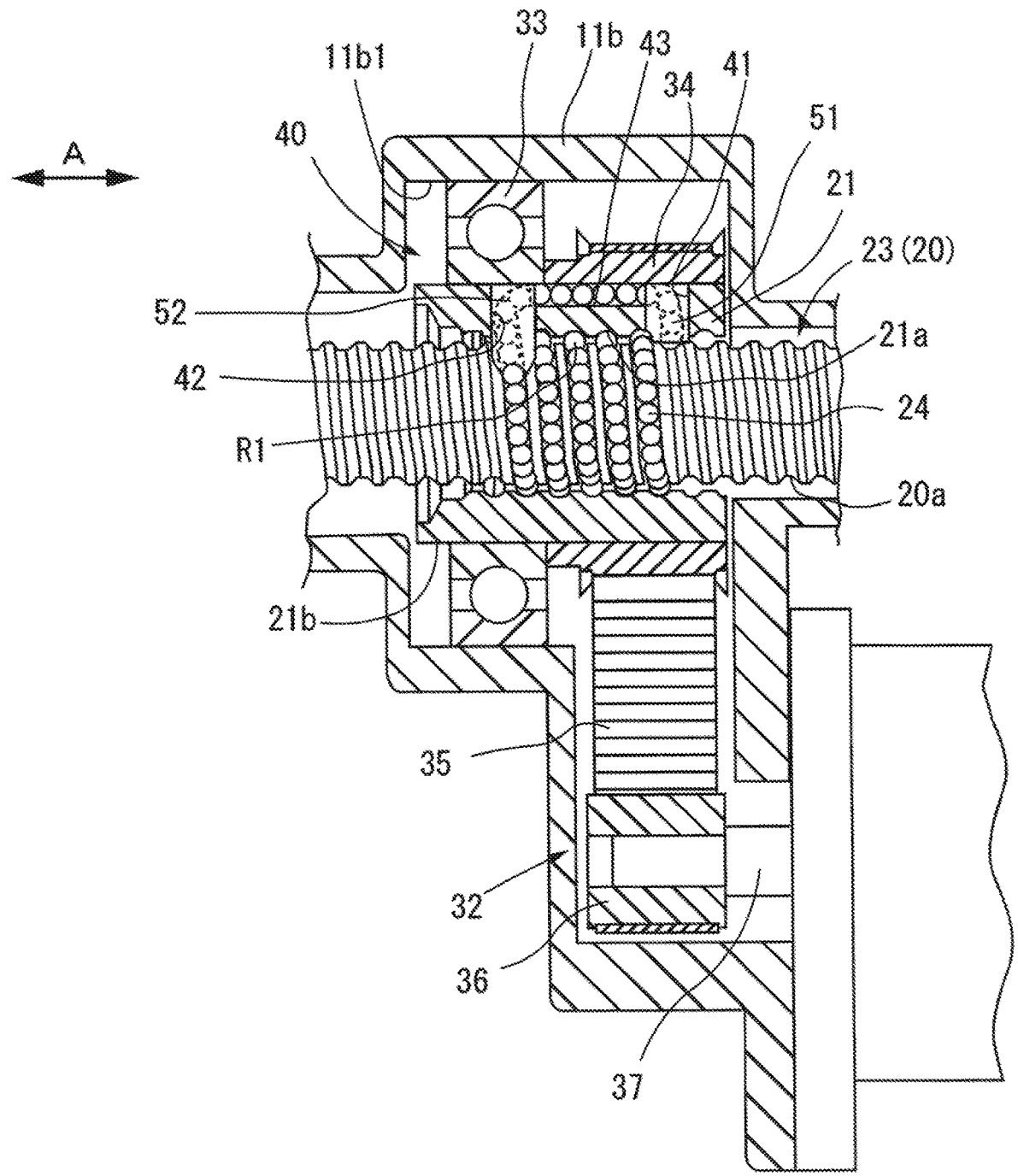
FIG. 2 is a partially enlarged sectional view of a steering assist mechanism and a ball screw device of FIG. 1 according to a first embodiment.

As illustrated in FIG. 2, the driving force transmission mechanism 32 includes a driving pulley 36, a driven pulley 34, and a toothed belt 35. The driving pulley 36 is attached to an output shaft 37 of the motor M. The output shaft 37 is arranged parallel to the axis of the steering operation shaft 20. The driven pulley 34 is arranged on an outer peripheral side of the ball nut 21 so as to be rotatable together with the ball nut 21. One end side (left side in FIG. 2) of the ball nut 21 in the direction A is rotatably supported on an inner peripheral surface 11b1 of the second housing 11b via a ball bearing 33. The toothed belt 35 is looped over the driving pulley 36 and the driven pulley 34. The driving force transmission mechanism 32 transmits a rotational driving force generated by the motor M between the driving pulley 36 and the driven pulley 34 via the toothed belt 35.

As illustrated in FIG. 2, the ball screw device 40 is mainly housed in the second housing 11b. The ball screw device 40 includes the ball screw portion 23 of the steering operation shaft 20 (corresponding to the ball screw shaft), the ball nut 21 (corresponding to a nut), a plurality of rolling balls 24 (corresponding to rolling elements), and a pair of deflectors 51 and 52. A helical outer peripheral ball rolling track 20a is formed on the outer peripheral surface of the ball screw portion 23 of the steering operation shaft 20. The outer peripheral ball rolling track 20a is formed by being turned a plurality of times.

The ball nut 21 is formed into a tubular shape, and is arranged on an outer peripheral side of the ball screw portion 23 coaxially with the ball screw portion 23 (steering operation shaft 20). The inner peripheral surface of the ball nut 21 includes a helical inner peripheral ball rolling track 21a. The inner peripheral ball rolling track 21a is formed by being turned a plurality of times. The outer peripheral ball rolling track 20a of the ball screw portion 23 and the inner peripheral ball rolling track 21a of the ball nut 21 are arranged so as to face each other. A ball rolling path R1 is formed between the outer peripheral ball rolling track 20a and the inner peripheral ball rolling track 21a. The rolling balls 24 roll along the ball rolling path R1. The rolling balls 24 are arrayed in the ball rolling path R1 in a rollable manner. Thus, the outer peripheral ball rolling track 20a of the ball screw portion 23 (steering operation shaft 20) and the inner peripheral ball rolling track 21a of the ball nut 21 threadedly engage with each other via the rolling balls 24.

Figure 3:
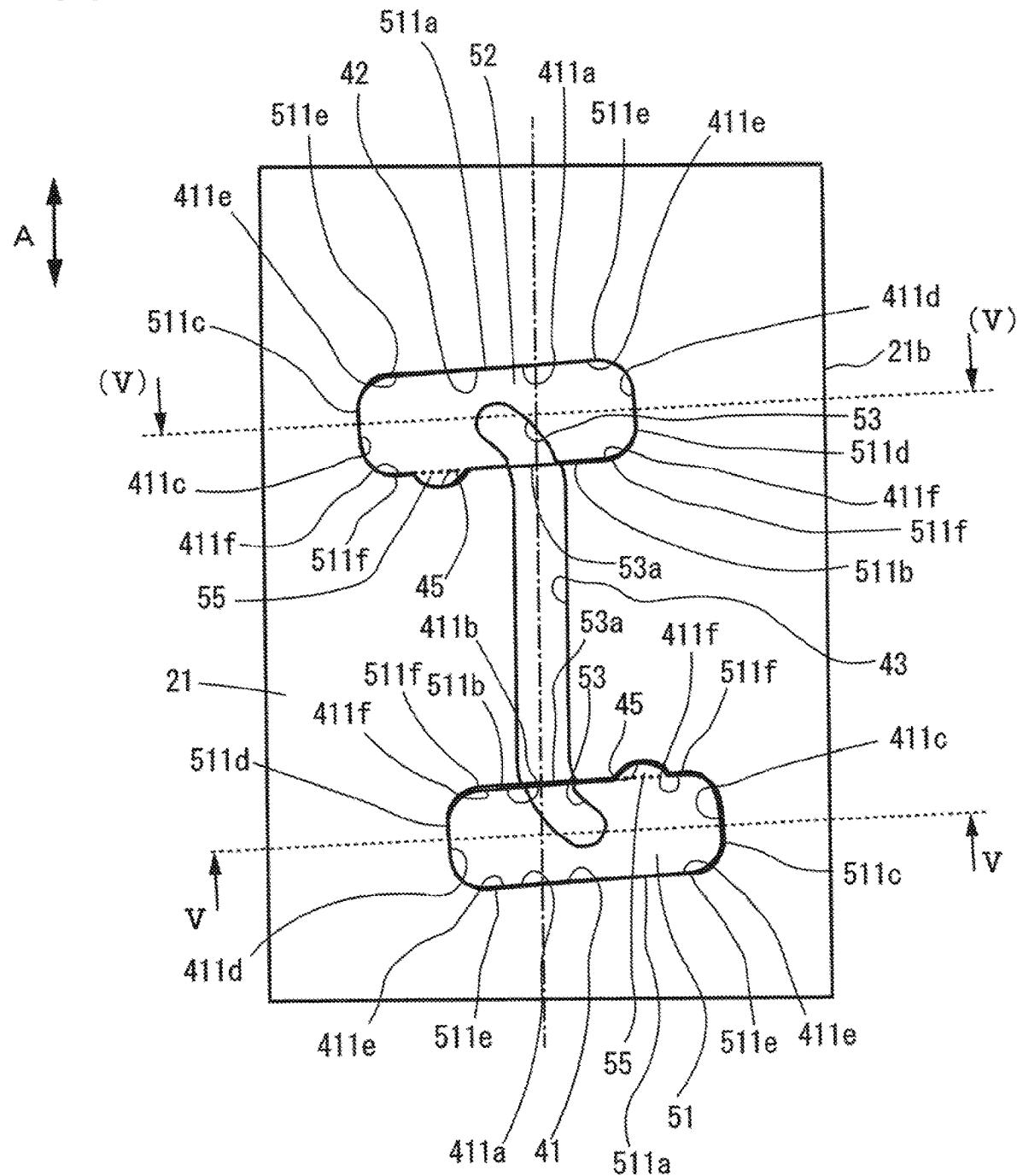
FIG. 3 is a view illustrating the outer shape of a ball nut on which deflectors are mounted according to the first embodiment.

As illustrated in FIG. 2 and FIG. 3, the ball nut 21 has a pair of (two) attachment holes 41 and 42 each passing through a portion between an outer peripheral surface 21b and the inner peripheral surface. Details of the shapes of the attachment holes 41 and 42 are described later. As illustrated in FIG. 2, the attachment holes 41 and 42 are arranged with a predetermined distance therebetween in the direction A. That is, the attachment holes 41 and 42 are arranged across a plurality of rows of thread of the inner peripheral ball rolling track 21a of the ball nut 21.

Figure 4:
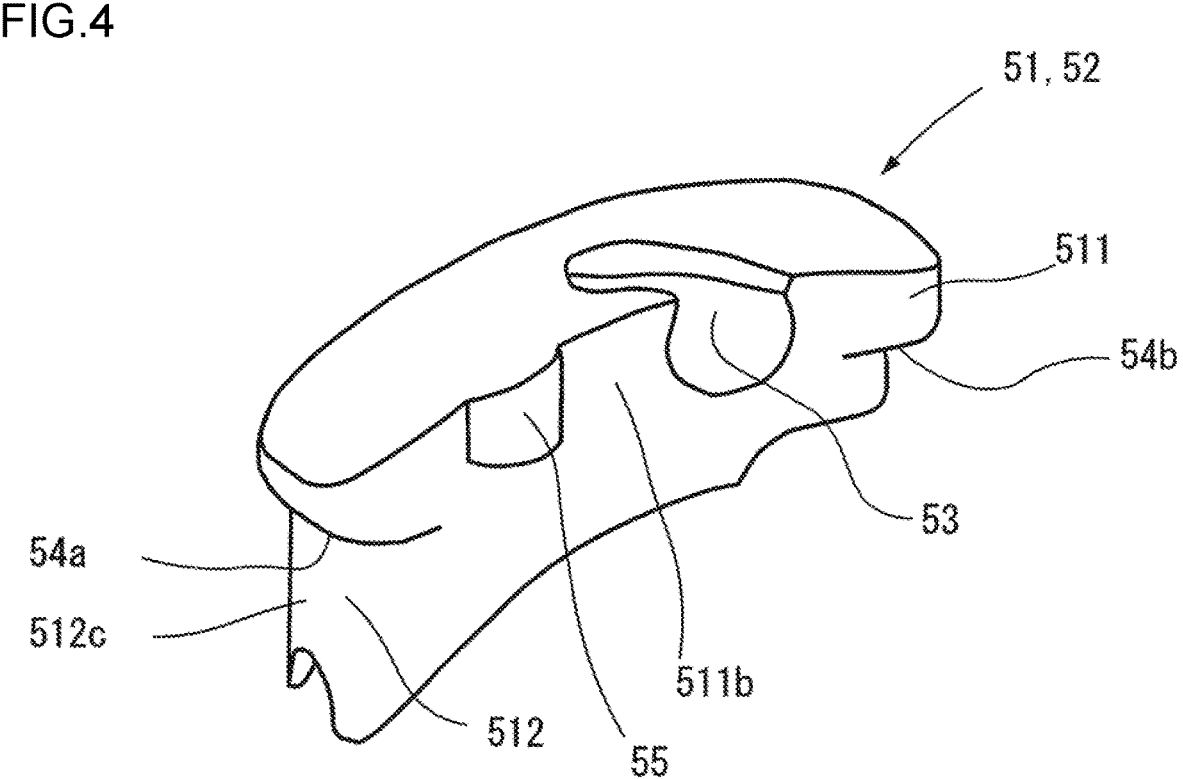
FIG. 4 is a perspective view of the deflector of FIG. 3.

A first ball recirculation path 43 connected between the attachment holes 41 and 42 is formed on the outer peripheral surface 21b of the ball nut 21. The first ball recirculation path 43 extends substantially along an axial direction (direction A) of the ball nut 21, and is open to a radially outer side of the ball nut 21. The opening width of the first ball recirculation path 43 is slightly larger than the diameter of the rolling ball 24. The bottom surface of the first ball recirculation path 43 is a curved surface formed at a radius of curvature that is slightly larger than the radius of the rolling ball 24. Thus, the rolling balls 24 are freely rollable reciprocally along the first ball recirculation path 43. FIG. 4 is a perspective view of each of the deflectors 51 and 52 that is housed in each of the attachment holes 41 and 42 correspondingly.

Figure 5:
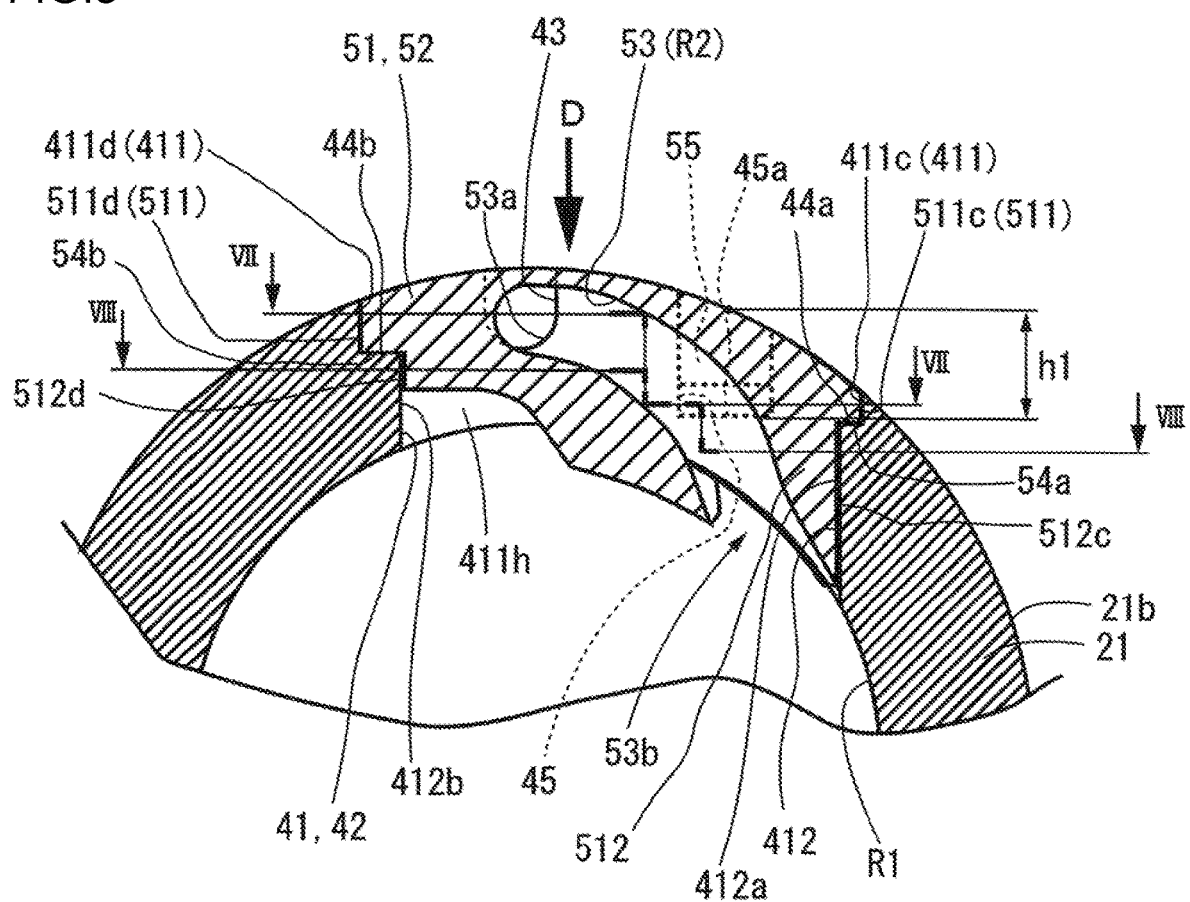
FIG. 5 is a sectional view taken along a line V-V and viewed in a direction of arrows in FIG. 3.

As illustrated in FIG. 2, FIG. 3, and FIG. 5, the deflectors 51 and 52 are fixed while being respectively housed in the attachment holes 41 and 42. A fixing method is described later. The deflectors 51 and 52 are respectively inserted into the attachment holes 41 and 42 from the top in a vertical direction (see an arrow D in FIG. 5). The posture of the deflector 51 or 52 relative to the attachment hole 41 or 42 as illustrated in FIG. 5 is hereinafter referred to as a posture of the deflectors 51 and 52 housed in the attachment hole 41.

Each of the deflectors 51 and 52 has a second ball recirculation path 53 that is a through hole. The ends of the second ball recirculation paths 53 and 53 on one side are respectively connected to the ends of the first ball recirculation path 43 in a state in which the deflectors 51 and 52 are respectively housed in and fixed to the attachment holes 41 and 42, thereby forming first opening holes 53a. The ends of the second ball recirculation paths 53 and 53 on the other side are connected to the ball rolling path R1, thereby forming second opening holes 53b at two predetermined points in the ball rolling path R1 (see FIG. 5).

Each of the deflectors 51 and 52 has a function of guiding the rolling balls 24, which are scooped up from the ball rolling path R1 via the second opening hole 53b, to the first ball recirculation path 43 through the second ball recirculation path 53. Each of the deflectors 51 and 52 also has a function of discharging the rolling balls 24 in the first ball recirculation path 43 to the ball rolling path R1 through the second ball recirculation path 53. The deflectors 51 and 52 are formed into similar shapes and have similar functions. The deflectors 51 and 52 and the attachment holes 41 and 42 into which the deflectors 51 and 52 are respectively inserted are described later in detail.

As illustrated in FIG. 2, the ball bearing 33 and the driven pulley 34 are attached to the outer peripheral surface 21b of the ball nut 21. By attaching the ball bearing 33 and the driven pulley 34, the opening portion of the first ball recirculation path 43 on the outer peripheral surface 21b of the ball nut 21 is closed, and the deflectors 51 and 52 are prevented from respectively falling off the attachment holes 41 and 42. The ball nut 21 is supported by the ball bearing 33 so as to be rotatable relative to the second housing 11b (housing 11).

The second ball recirculation paths 53 respectively formed in the deflectors 51 and 52 and a space surrounded by the inner wall surface of the first ball recirculation path 43 provided in the ball nut 21 and the inner wall surface of the driven pulley 34 constitute a ball recirculation path R2 that bridges two predetermined points in the ball rolling path R1. The rolling balls 24 (rolling elements) endlessly circulate between the two predetermined points in the ball rolling path R1 via the ball recirculation path R2.

Next, the attachment holes 41 and 42 provided in the ball nut 21 are described with reference to FIG. 3, FIG. 5, and FIG. 6. As described above, the attachment holes 41 and 42 longitudinally extend in a circumferential direction of the outer peripheral surface 21b of the ball nut 21, and are formed through the portion between the outer peripheral surface 21b and the inner peripheral surface. The attachment holes 41 and 42 have the same structure, and therefore one attachment hole 41 is only described below. The direction indicated by the arrow D in FIG. 5 is a direction in which the deflector 51 is inserted into the attachment hole 41 (hereinafter referred to simply as an insertion direction D).

Figure 6:
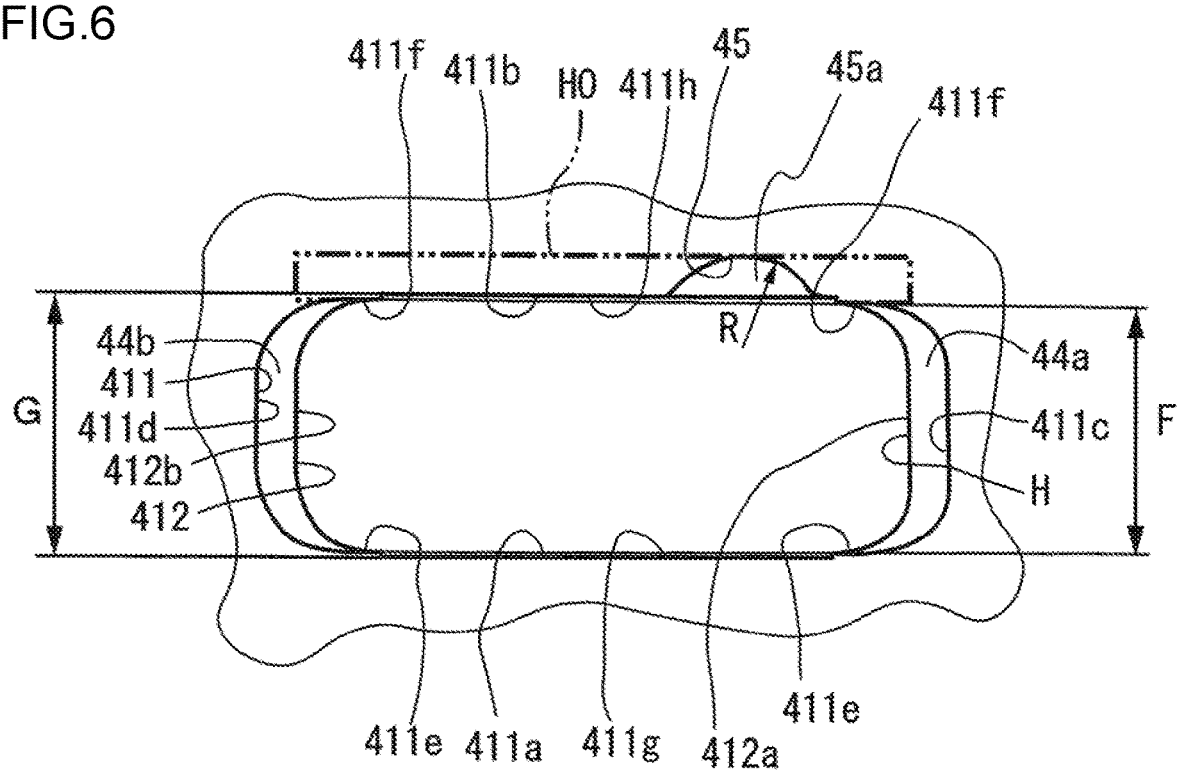
FIG. 6 is a view of an attachment hole as viewed in an insertion direction D.

As illustrated in FIG. 5 and FIG. 6, the attachment hole 41 includes a press-fitting hole portion 411, a guiding hole portion 412, and a pair of stopping surfaces 44a and 44b. An outer peripheral portion 511 of the deflector 51 that is described later is housed in and press-fitted to the press-fitting hole portion 411. An inner peripheral portion 512 of the deflector 51 that is described later is housed in the guiding hole portion 412. The stopping surfaces 44a and 44b respectively abut against a pair of stopped surfaces 54a and 54b of the deflector 51 that are described later, thereby positioning the deflector 51 in the insertion direction D.

The press-fitting hole portion 411 is formed closer to the outer peripheral surface 21b of the ball nut 21 in a radial direction of the ball nut 21. As illustrated in FIG. 6, the press-fitting hole portion 411 is formed as a substantially rectangular hole that is rounded at the corners in a sectional shape orthogonal to the insertion direction D of the deflector 51.

In this embodiment, the longitudinal direction of the substantial rectangle in the cross section of the press-fitting hole portion 411 is not a direction parallel to the end face of the ball nut 21, that is, a direction orthogonal to the axis of the ball nut 21. In this embodiment, the longitudinal direction of the press-fitting hole portion 411 is a direction substantially parallel to an extending direction of a projected track formed such that the inner peripheral ball rolling track 21a formed on the inner peripheral surface of the ball nut 21 is expanded radially outward and is projected on the outer peripheral surface 21b.

As illustrated in FIG. 6, the press-fitting hole portion 411 has a pair of first faces 411a and 411b and a pair of first end faces 411c and 411d. The first faces 411a and 411b extend in the circumferential direction of the outer peripheral surface 21b of the ball nut 21. The first end faces 411c and 411d intersect the first faces 411a and 411b at a right angle, and are connected to the ends of the first faces 411a and 411b in the longitudinal direction via the rounded portions.

The first faces 411a and 411b are formed so as to face each other in the axial direction of the ball nut 21 and to be parallel to each other. The first faces 411a and 411b are formed so that the extending length in the circumferential direction of the outer peripheral surface 21b of the ball nut 21, which is the longitudinal direction, is larger than the facing distance. The first faces 411a and 411b include frictionally locking surfaces 411e, 411e, 411f, and 411f and first flat surfaces 411g and 411h. The frictionally locking surfaces 411e and 411e and the frictionally locking surfaces 411f and 411f are respectively formed at both ends of the first face 411a in the longitudinal direction and at both ends of the first face 411b in the longitudinal direction.

The first flat surfaces 411g and 411h are respectively provided between the frictionally locking surfaces 411e and 411e and between the frictionally locking surfaces 411f and 411f. Small steps are respectively present between each of the frictionally locking surfaces 411e and 411e and the first flat surface 411g and between each of the frictionally locking surfaces 411f and 411f and the first flat surface 411h. The steps are formed because a width F between each of the frictionally locking surfaces 411e and 411e and each of the frictionally locking surfaces 411f and 411f, which face each other, is smaller than a width G between the first flat surfaces 411g and 411h, which face each other (F<G). In this embodiment, the first flat surfaces 411g and 411h are surfaces simply subjected to rough machining. Thus, the processing time is shortened to reduce cost.

One first face 411b out of the pair of first faces 411a and 411b has a recess 45. The recess 45 may be provided in the other first face 411a. Further, the recess 45 may be provided in both of the first faces 411a and 411b. The recess 45 is formed so as to extend in the insertion direction D (vertical direction in FIG. 5) of the deflector 51. As illustrated in FIG. 6, the recess 45 has a groove shape in which the inner peripheral surface in a cross section orthogonal to the extending direction is formed at a predetermined radius of curvature. As illustrated in FIG. 5, the recess 45 is formed so as to be open to the outer peripheral surface 21b of the ball nut 21 and to extend from the outer peripheral surface 21b up to a predetermined depth h1.

In this embodiment, the predetermined depth h1 of the recess 45 is such a depth that the recess 45 does not reach the inner peripheral surface of the ball nut 21 or pass through the ball nut 21. Specifically, the predetermined depth h1 of the recess 45 is approximately set within a range of the first face 411b in the radial direction of the ball nut 21. Thus, the recess 45 is open to the outer peripheral surface 21b of the ball nut 21, and has a bottom surface 45a.

The recess 45 is formed so that, when the deflector 51 is inserted into the attachment hole 41, the recess 45 can guide the deflector 51 in the insertion direction D by engaging with a protrusion 55 formed on a second face 511b of the deflector 51 to have a semicircular column shape (corresponding to a rail shape). The semicircular column shape refers to a shape of one of two segments of a column that is cut in its axial direction. The semicircular column may be one of two segments of a column that is cut at an arbitrary position instead of two equal segments of a bisected column.

As illustrated in FIG. 5, when the deflector 51 is housed in and fixed to the attachment hole 41, a clearance is secured between the lower end of the protrusion 55 and the bottom surface 45a of the recess 45. The present invention is not limited to this structure, and the recess 45 may pass through the ball nut 21 up to the inner peripheral surface of the ball nut 21 without the bottom surface 45a. This structure involves a slight decrease in the strength of the ball nut 21, but can attain an effect similar to that in the case where the recess 45 does not pass through the ball nut 21 up to the inner peripheral surface of the ball nut 21.

The guiding hole portion 412 passes through the ball nut 21 up to the inner peripheral surface of the ball nut 21. The guiding hole portion 412 is formed as a substantially rectangular hole that is rounded at the corners in a sectional shape orthogonal to the insertion direction D of the deflector 51 (see FIG. 6). That is, the guiding hole portion 412 has two end faces connected via the rounded portions to the two ends of each surface extending in the longitudinal direction of the substantial rectangle. The two end faces include a pair of guiding surfaces 412a and 412b configured to guide the insertion of the deflector 51. The faces of the guiding hole portion 412 in the longitudinal direction are flush with the first flat surfaces 411g and 411h provided in the first faces 411a and 411b of the press-fitting hole portion 411. Thus, the faces of the guiding hole portion 412 in the longitudinal direction also serve as the first faces 411a and 411b.

The guiding surfaces 412a and 412b are formed so as to face each other and to be parallel to each other. The guiding surfaces 412a and 412b and the first end faces 411c and 411d of the press-fitting hole portion 411 are formed parallel to each other.

The stopping surfaces 44a and 44b are surfaces that respectively abut against the stopped surfaces 54a and 54b of the deflector 51 that are described later in the state in which the deflector 51 is housed in and fixed to the attachment hole 41, thereby positioning the deflector 51 in the insertion direction D. As illustrated in FIG. 5, the stopping surfaces 44a and 44b are formed on different planes, and are orthogonal to the first end faces 411c and 411d. The stopping surface 44a is formed closer to the inner peripheral ball rolling track 21a of the ball nut 21 (nut) with respect to the first end face 411c. The stopping surface 44b is formed closer to the inner peripheral ball rolling track 21a of the ball nut 21 (nut) with respect to the first end face 411d.

In the above description, an edge HO is defined as an edge of a through hole portion H that is a through portion of the attachment hole 41 as viewed in a projected manner in the insertion direction D in which the deflector 51 is inserted into the attachment hole 41 (see a long dashed double-short dashed line in FIG. 6). In this embodiment, the edge HO is located closer to the first face 411b provided with the recess 45. The edge HO is a part of the first face 411b that forms the attachment hole 41. The edge HO together with the protrusion 55 of the deflector 51 that is described later forms an engagement structure in which the edge HO and the protrusion 55 engage with each other. Details are described later.

In the case of the structure in which the recess 45 passes through the ball nut 21 up to the inner peripheral surface of the ball nut 21, it is appropriate to assume that the inner peripheral surface of the recess 45 is a part of the through hole portion H and the edge HO is an edge along the inner peripheral surface of the recess 45. In this case, the inner peripheral surface of the recess 45 is a part of the first face 411b. The edge HO is also a part of the first face 411b. The edge HO is used in the description to be given later.

Next, the deflectors 51 and 52 of this embodiment are described in detail with reference to FIG. 3 to FIG. 5, FIG. 7, and FIG. 8. The deflectors 51 and 52 have the same structure, and therefore the structure of the deflector 51 is only described below for convenience. FIG. 3 and FIG. 5 are a plan view and a sectional view of the deflector 51 that is housed in and fixed to the attachment hole 41 of the ball nut 21.

As illustrated in FIG. 4 and FIG. 5, the deflector 51 includes the outer peripheral portion 511 and the inner peripheral portion 512 that are described above. The outer peripheral portion 511 is arranged at an outer peripheral part of the ball nut 21 in the state in which the deflector 51 is housed in and fixed to the attachment hole 41. The inner peripheral portion 512 is arranged closer to the inner peripheral ball rolling track 21a with respect to the outer peripheral portion 511 in the state in which the deflector 51 is housed in and fixed to the attachment hole 41.

Figure 7:
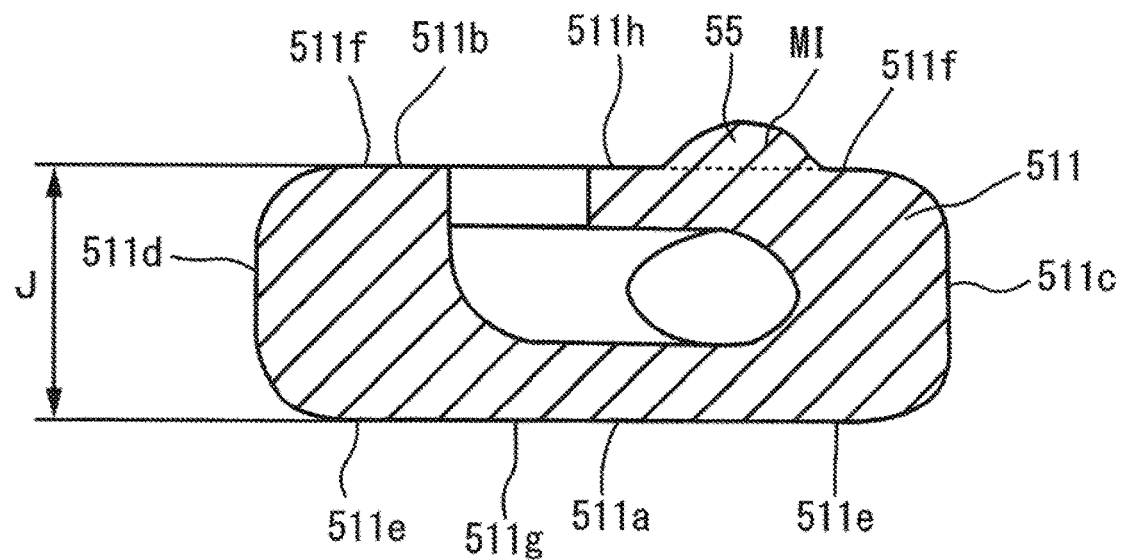
FIG. 7 is a sectional view of an outer peripheral portion of the deflector in a cross section taken along a line VII-VII and viewed in a direction of arrows in FIG. 5.

The outer peripheral portion 511 is formed so that the outer sectional shape orthogonal to the insertion direction D that is illustrated in FIG. 7 is similar to the sectional shape of the press-fitting hole portion 411 of the attachment hole 41 that is illustrated in FIG. 6. That is, the outer peripheral portion 511 is formed so that the sectional shape orthogonal to the insertion direction D is a substantially rectangular shape that is rounded at the corners.

The outer peripheral portion 511 has a pair of second faces 511a and 511b that respectively face the first faces 411a and 411b of the attachment hole 41 in the state in which the deflector 51 is housed in and fixed to the attachment hole 41. Further, the outer peripheral portion 511 has a pair of second end faces 511c and 511d that respectively face the first end faces 411c and 411d of the attachment hole 41. The second faces 511a and 511b include frictionally locked surfaces 511e, 511e, 511f, and 511f at the two respective ends in the longitudinal direction. The second faces 511a and 511b are arranged back to back and parallel to each other, and the second end faces 511c and 511d are also arranged back to back and parallel to each other. The second faces 511a and 511b and the second end faces 511c and 511d intersect each other at a right angle.

In the state in which the deflector 51 is housed in the attachment hole 41 as illustrated in FIG. 5, each of the frictionally locked surfaces 511e, 511e, 511f, and 511f is fitted (press-fitted) to a corresponding one of the frictionally locking surfaces 411e, 411e, 411f, and 411f of the first faces 411a and 411b of the attachment hole 41 with an interference and with a predetermined frictional force.

At this time, a second flat surface 511g arranged between the frictionally locked surfaces 511e and 511e of the second face 511a extending in the longitudinal direction is fitted with a clearance to the corresponding first flat surface 411g (see FIG. 6) arranged between the frictionally locking surfaces 411e and 411e of the first face 411a of the attachment hole 41. A second flat surface 511h arranged between the frictionally locked surfaces 511f and 511f of the second face 511b extending in the longitudinal direction is fitted with a clearance to the corresponding first flat surface 411h (see FIG. 6) arranged between the frictionally locking surfaces 411f and 411f of the first face 411b of the attachment hole 41.

No steps are respectively present on the second faces 511a and 511b of the deflector 51. The frictionally locked surfaces 511e and 511e and the second flat surface 511g are flush with each other, and the frictionally locked surfaces 511f and 511f and the second flat surface 511h are also flush with each other. Thus, the deflector 51 can be manufactured simply. In the state in which the deflector 51 is housed in the attachment hole 41, the second end faces 511c and 511d respectively face the first end faces 411c and 411d of the attachment hole 41, and are respectively fitted to the first end faces 411c and 411d with small clearances or in a slightly press-fitted state.

The inner peripheral portion 512 has a function of guiding the insertion direction D of the deflector 51 between the inner peripheral portion 512 and the guiding hole portion 412 of the attachment hole 41 when the deflector 51 is inserted into the attachment hole 41 along the insertion direction D. The inner peripheral portion 512 exerts its function before the frictionally locked surfaces 511e and 511e and the frictionally locked surfaces 511f and 511f of the outer peripheral portion 511 start to be respectively press-fitted to the frictionally locking surfaces 411e and 411e and the frictionally locking surfaces 411f and 411f of the attachment hole 41, during a period in which the press fitting is in progress, and until the deflector 51 is housed in the attachment hole 41.

Figure 8:
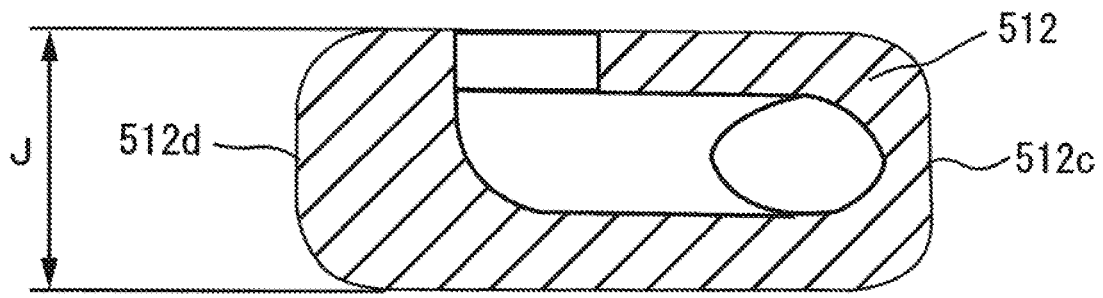
FIG. 8 is a sectional view of an inner peripheral portion of the deflector in a cross section taken along a line VIII-VIII and viewed in a direction of arrows in FIG. 5.

Similarly to the outer peripheral portion 511, the inner peripheral portion 512 is formed so that the sectional shape orthogonal to the insertion direction D is a substantially rectangular shape that is rounded at the corners (see FIG. 8). The inner peripheral portion 512 has a pair of guided surfaces 512c and 512d at the two ends of the substantially rectangular sectional shape in its longitudinal direction. The guided surfaces 512c and 512d are formed back to back and parallel to each other.

As illustrated in FIG. 5, the second end face 511c of the outer peripheral portion 511 and the guided surface 512c of the inner peripheral portion 512 are connected to each other by the stopped surface 54a, and the second end face 511d of the outer peripheral portion 511 and the guided surface 512d of the inner peripheral portion 512 are connected to each other by the stopped surface 54b. In this embodiment, the stopped surfaces 54a and 54b are surfaces that are orthogonal to the insertion direction D of the deflector 51 and are formed so as to be oriented to the inner peripheral ball rolling track 21a. When the deflector 51 is pushed into and press-fitted to the attachment hole 41 in the insertion direction D, the stopped surfaces 54a and 54b respectively abut against the stopping surfaces 44a and 44b formed in the attachment hole 41, thereby regulating the position of the deflector 51 in the insertion direction D.

As illustrated in FIG. 7, the second face 511b out of the pair of second faces 511a and 511b, which is mated to the recess 45 provided in the attachment hole 41, has the protrusion 55. That is, the protrusion 55 is a part of the second face 511b. The protrusion 55 is formed into a semicircular column shape (corresponding to the rail shape) so as to extend in the insertion direction D of the deflector 51 to be housed in the attachment hole 41. That is, the protrusion 55 is formed so as to extend parallel to the insertion direction D. The outer peripheral surface of the protrusion 55 is formed into a shape conforming to the shape of the inner peripheral surface of the engaging recess 45. And the protrusion 55 may be provided on the second face 511a, the recess 45 may be provided on the first face 411a.

As described above, when the deflector 51 is inserted into the attachment hole 41, the protrusion 55 engages with the recess 45 formed in the attachment hole 41, and is guided in the insertion direction D by the recess 45. As described above, the protrusion 55 forms the engagement structure in which the protrusion 55 engages with the edge HO of the attachment hole 41 in a state (hereinafter referred to also as an improper state) in which a part of the deflector 51 is inserted into the attachment hole 41 in a posture (inclined posture; see, for example, FIG. 9) different from the posture (see FIG. 5; hereinafter referred to also as a proper state) of the deflector 51 housed in the attachment hole 41.

That is, with the engagement structure, the edge HO of the through hole portion H of the attachment hole 41 as viewed in a projected manner in the insertion direction D of the deflector 51 overlaps a part of the protrusion 55 of the deflector 51 as viewed in a projected manner in the insertion direction D.

Next, an attachment relationship between the deflector 51 and the attachment hole 41 and actions are described in detail. In the structure described above, the guided surfaces 512c and 512d of the inner peripheral portion 512 of the deflector 51 are different from each other in terms of the length and shape at the right and left in FIG. 5. Thus, when the deflector 51 is actually inserted into the attachment hole 41 along the insertion direction D, the right guided surface 512c first enters the guiding hole portion 412 to engage with the guiding surface 412a.

Then, the left guided surface 512d enters the guiding hole portion 412 to engage with the guiding surface 412b. Therefore, when the deflector 51 is attached, it is difficult to accurately push the deflector 51 along the insertion direction D while keeping the posture illustrated in FIG. 5. As a result, the posture of the deflector 51 is lost, and the deflector 51 may be inclined with respect to the insertion direction D as illustrated in, for example, FIG. 9.

Figure 9:
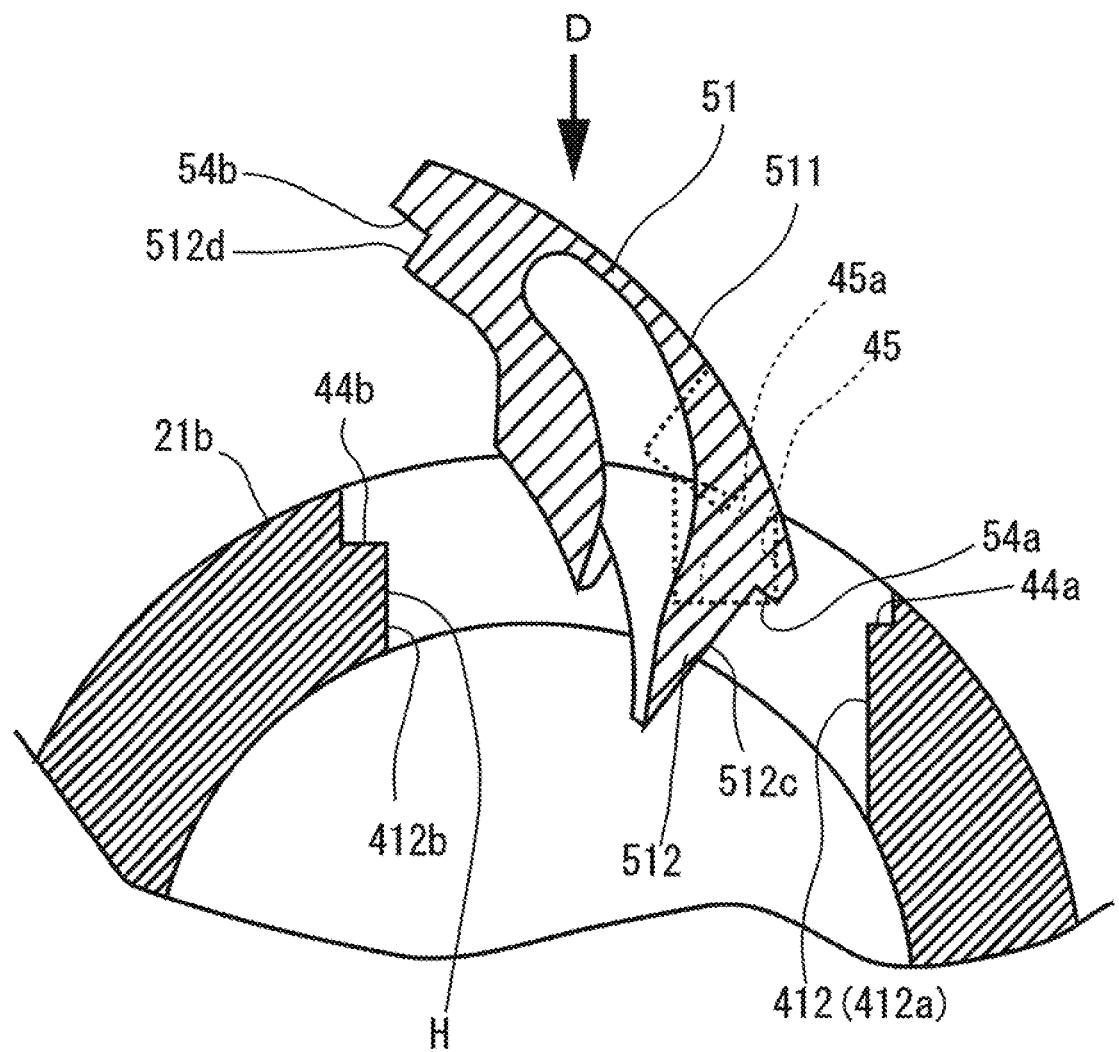
FIG. 9 is a view for describing a state in which the deflector is inclined.
Figure 10:
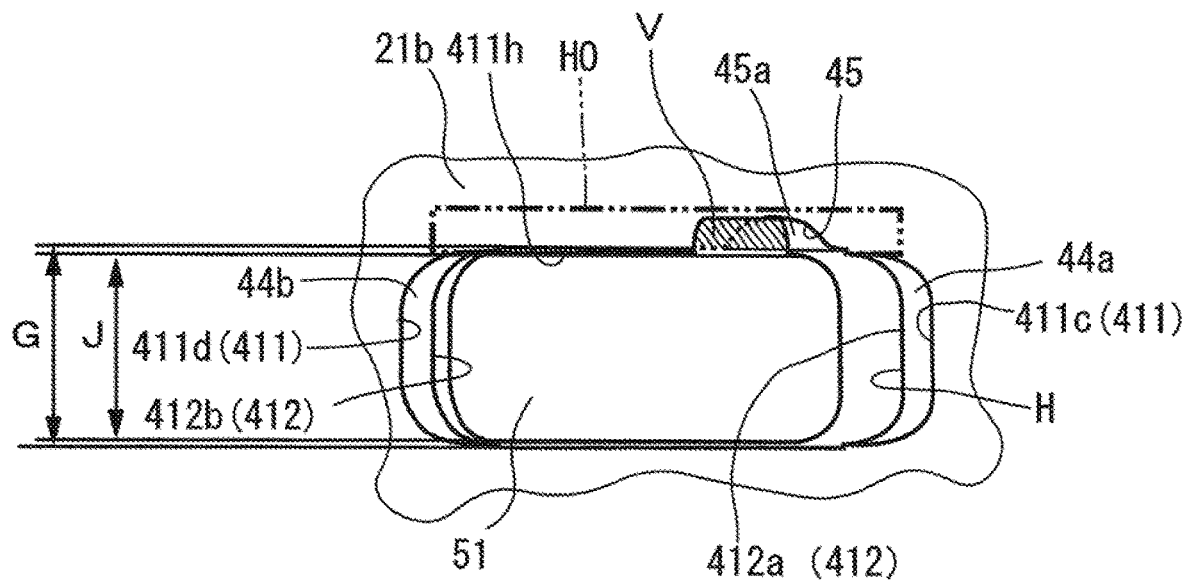
FIG. 10 is a view illustrating an overlap between a protrusion of the deflector and the attachment hole in FIG. 9.

Thus, when a part of the deflector 51 is inserted into the attachment hole 41 in the state in which the deflector 51 is inclined as illustrated in FIG. 9, that is, in the posture of the improper state that is different from the posture of the deflector 51 in the state (proper state) in which the deflector 51 is housed in the attachment hole 41 as illustrated in FIG. 5, the stopped surfaces 54a and 54b formed at the ends of the deflector 51 in the longitudinal direction may fail to respectively abut against the stopping surfaces 44a and 44b of the attachment hole 41. At this time, as illustrated in FIG. 10, the width G between the first flat surface 411g and the first flat surface 411h of the attachment hole 41, which form the through hole portion H of the attachment hole 41, is larger than a width J ($\approx$F) between the second face 511a and the second face 511b of the deflector 51 (G>J).

Therefore, when the second face 511b of the deflector 51 is not provided with any object as in, for example, the related art, the deflector may fall onto the radially inner side of the ball nut 21 from the side of the outer peripheral surface 21b of the ball nut 21 through the through hole portion H of the attachment hole 41 at the moment when an operator releases his/her hand from the inclined deflector. In this case, for example, the operator needs to retrieve the deflector that has fallen into the ball nut 21, and then reattach the deflector to the attachment hole 41. Thus, additional man-hour is required for the attachment. As a result, the cost of the ball screw device 40 may increase.

In this embodiment, the deflector 51 is provided with the protrusion 55 even in the case of the deflector 51 and the attachment hole 41 that are formed into the shapes similar to those of the related art. That is, as described above, this embodiment provides the locking structure in which the attachment hole 41 and the deflector 51 lock each other in the state (improper state) in which a part of the deflector 51 is inserted into the attachment hole 41 in the posture (inclined posture; see, for example, FIG. 9) different from the posture (see FIG. 5) of the deflector 51 housed in the attachment hole 41. In other words, the edge HO of the through hole portion H of the attachment hole 41 as viewed in a projected manner in the insertion direction D of the deflector 51 as illustrated in FIG. 10 is formed so as to overlap, in the improper state, a part of the protrusion 55 of the deflector 51 as viewed in a projected manner in the insertion direction D.

In this embodiment, the edge HO of the through hole portion H is constituted by the outer peripheral surface 21b of the ball nut 21 and the bottom surface 45a of the recess 45. In this embodiment, the protrusion 55 is formed so as to extend in the semicircular column shape.

In the structure described above, when a part of the deflector 51 is inserted into the attachment hole 41 in the posture different from the posture (see FIG. 5) of the deflector 51 housed in the attachment hole 41, as illustrated in FIG. 10, the projected length of the protrusion 55 in the longitudinal direction of the deflector 51 as viewed in the insertion direction D is larger than the projected length in the posture of the deflector 51 housed in the attachment hole 41.

Therefore, even in the structure in which the recess 45 passes through the ball nut 21 up to the inner peripheral surface of the ball nut 21, the projected range of the protrusion 55 as viewed in the insertion direction D overlaps the edge HO of the through hole portion H (see a portion V (hatched portion) in FIG. 10). In this embodiment, the protrusion 55 actually abuts against a part of the portion V that corresponds to the outer peripheral surface 21b of the ball nut 21 except for the bottom surface 45a of the recess 45. Thus, even if the operator releases his/her hand, the protrusion 55 does not pass through the attachment hole 41 of the ball nut 21 that is a part of the edge HO, and therefore the deflector 51 does not fall into the radially inner portion of the ball nut 21.

With the structure described above, even if the operator who is attaching the deflector 51 to the attachment hole 41 releases his/her hand from the deflector 51 inserted into the attachment hole 41 in the posture different from the posture (see FIG. 5) of the deflector 51 housed in the attachment hole 41, the engagement structure prevents the deflector 51 from falling onto the radially inner side of the ball nut 21. Thus, the operator can promptly pick up the deflector 51 caught on the engagement structure, and then promptly resume attaching the deflector 51 to the attachment hole 41. Accordingly, the operation is efficient.

Figure 11A:
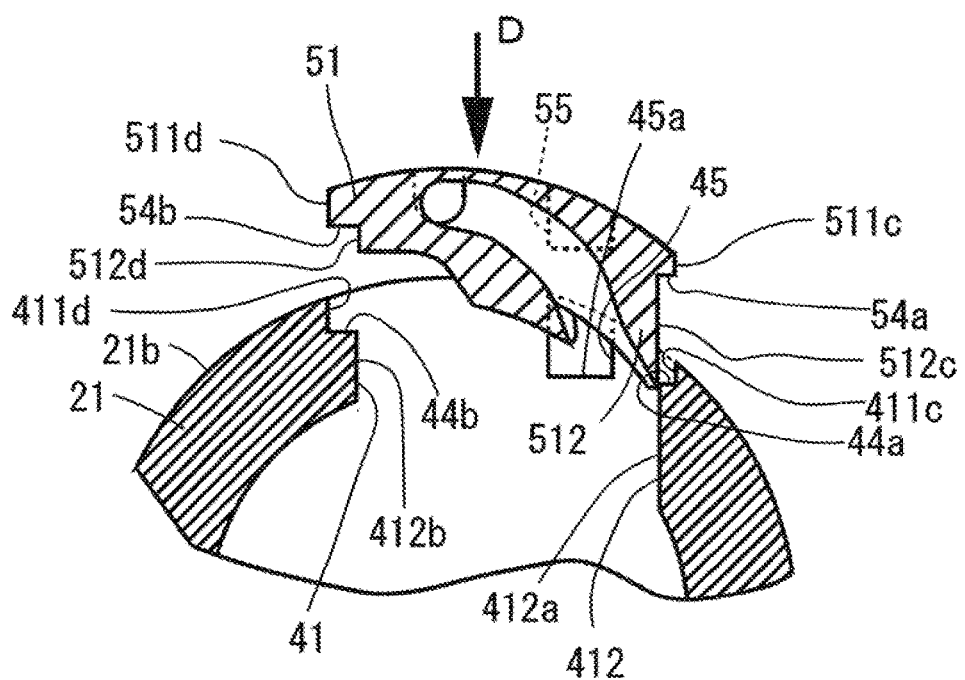
FIG. 11A is a view illustrating a first state of engagement between the deflector and the attachment hole.
Figure 11B:
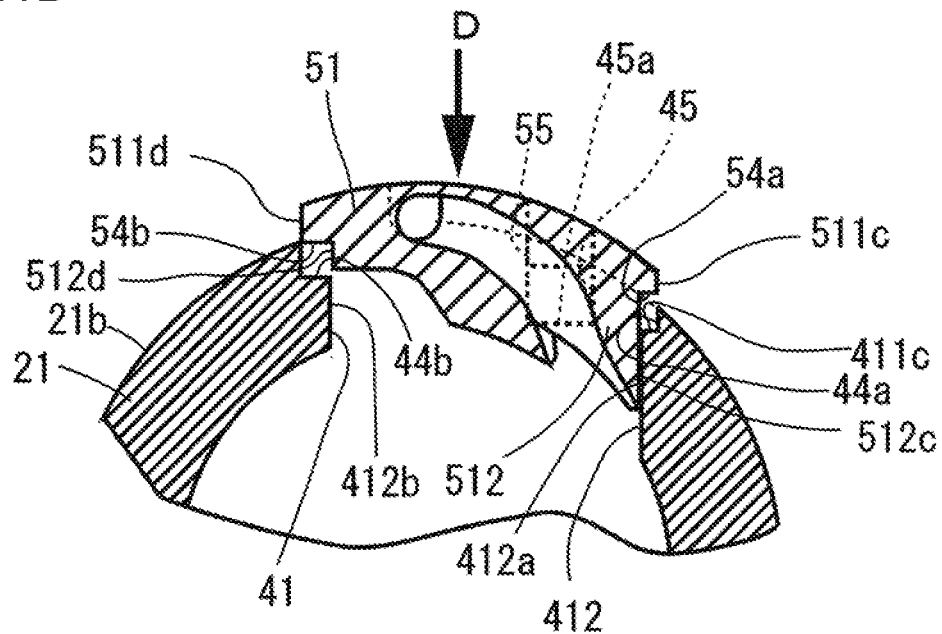
FIG. 11B is a view illustrating a second state of engagement between the deflector and the attachment hole.

Next, the insertion of the deflector 51 into the attachment hole 41 in the posture of the proper state in which the deflector 51 is housed in the attachment hole 41 as illustrated in FIG. 5 is described with reference to FIG. 11A (first state) to FIG. 11E (fifth state). In this case, as illustrated in FIG. 11A (first state), the right guided surface 512c of the deflector 51 first engages with the right guiding surface 412a of the attachment hole 41. Next, as illustrated in FIG. 11B (second state), the protrusion 55 provided on the second face 511b of the deflector 51 starts to engage with the recess 45 of the attachment hole 41. The recess 45 guides the engaging protrusion 55, that is, the deflector 51, in the insertion direction D. Thus, the movement of the deflector 51 in the insertion direction D is supported.

Figure 11C:
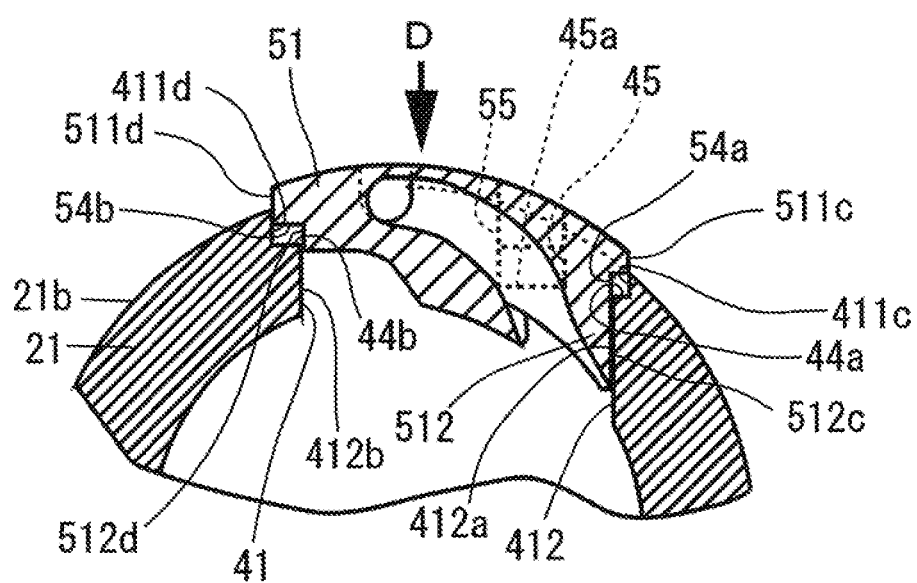
FIG. 11C is a view illustrating a third state of engagement between the deflector and the attachment hole.

Next, as illustrated in FIG. 11C (third state), the right frictionally locked surfaces 511e and 511f and the left frictionally locked surfaces 511e and 511f (see FIG. 7; illustration is omitted in FIG. 11C) of the deflector 51 start to be respectively fitted (press-fitted) to the right and left frictionally locking surfaces 411e and 411f with interferences.

Figure 11D:
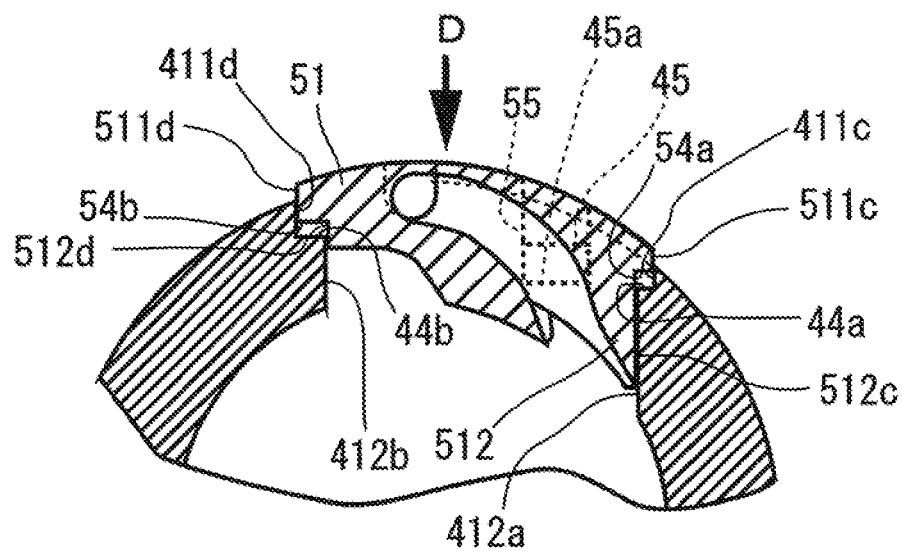
FIG. 11D is a view illustrating a fourth state of engagement between the deflector and the attachment hole.
Figure 11E:
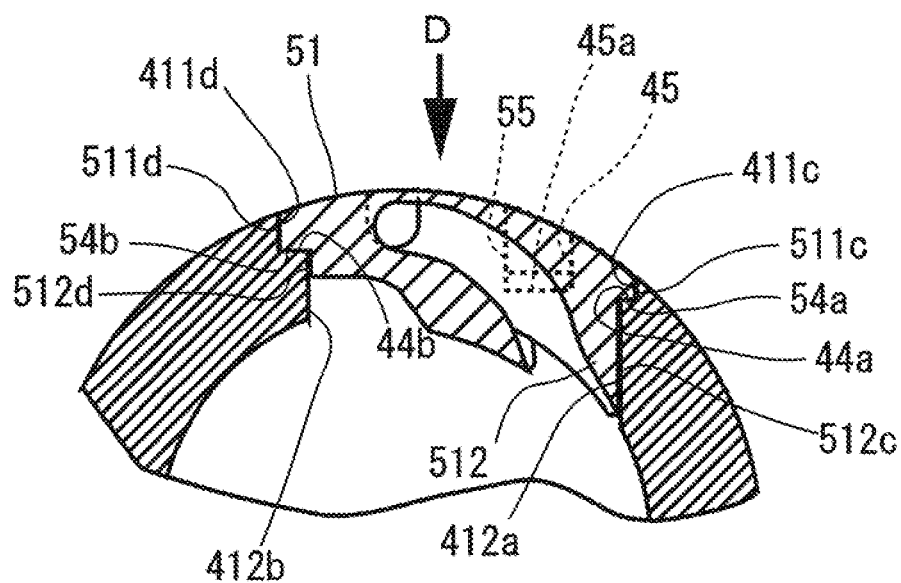
FIG. 11E is a view illustrating a fifth state of engagement between the deflector and the attachment hole.

As illustrated in FIG. 11D (fourth state), the left guided surface 512d engages with the left guiding surface 412b of the attachment hole 41. Thus, the insertion of the deflector 51 in the insertion direction D is supported more securely. Then, as illustrated in FIG. 11E (fifth state), the stopped surfaces 54a and 54b respectively abut against the stopping surfaces 44a and 44b formed in the attachment hole 41 substantially at the same time, thereby regulating the position of the deflector 51 in the insertion direction D. Thus, the deflector 51 is housed in and fixed to the attachment hole 41. The order from the second state (FIG. 11B) to the fourth state (FIG. 11D) is not limited to the order described above, and may be changed by design changes to the deflector 51 and the attachment hole 41.

Figure 12:
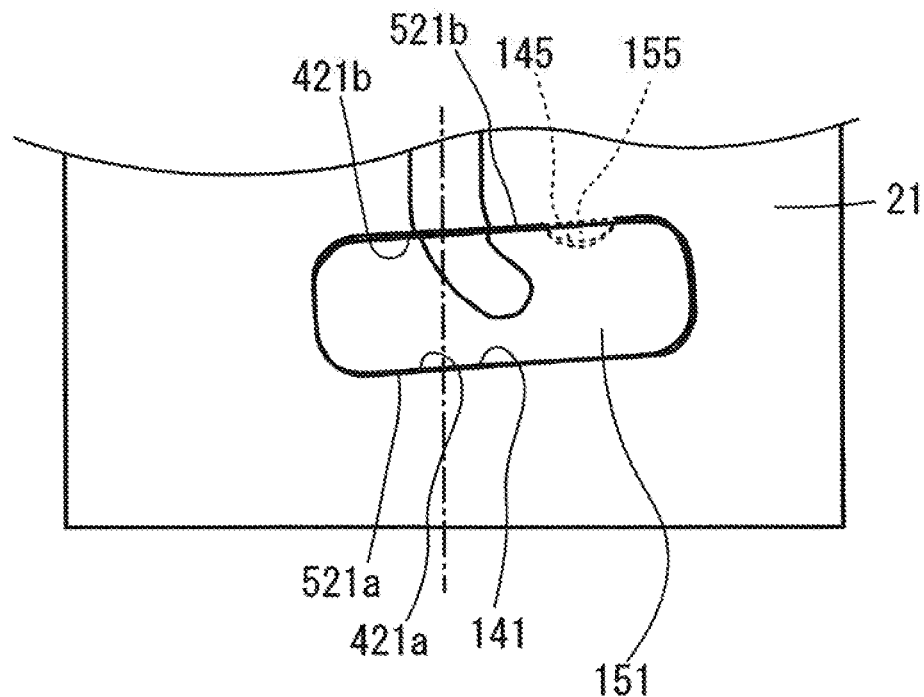
FIG. 12 is a view corresponding to FIG. 3, for describing Modified Example 1.

As illustrated in FIG. 12, as Modified Example 1 of the first embodiment described above, a protrusion 155 may be provided on a first face 421b of an attachment hole 141, and a recess 145 that engages with the protrusion 155 may be provided on a second face 521b of a deflector 151. In this case, the recess 145 is formed so as to be open to the inner peripheral surface of the deflector 151. When the deflector 151 is inserted into the attachment hole 141, it is only necessary that the protrusion 155 engage with the recess 145 from the side of the inner peripheral surface of the deflector 151. Also in this structure, effects similar to those of the embodiment described above can be expected. Further, a protrusion 155 may be provided on a first face 421a of an attachment hole 141, and a recess 145 that engages with the protrusion 155 may be provided on a second face 521a of a deflector 151.

Figure 13:
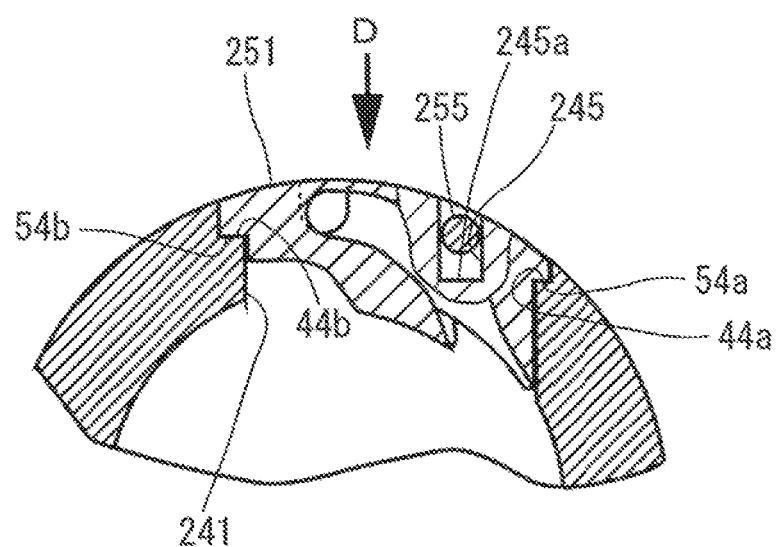
FIG. 13 is a view corresponding to FIG. 5, for describing Modified Example 2.

In the first embodiment described above, the protrusion 55 is formed parallel to the insertion direction D of the deflector 51 and into the semicircular column shape (rail shape). The present invention is not limited to this structure. As Modified Example 2, a protrusion 255 may be formed into a hemispherical shape (see FIG. 13). In this case, it is only necessary that a recess 245 be formed into a shape similar to that of the recess 45 of the first embodiment.

Thus, even if the operator releases his/her hand from a deflector 251 in a state in which a part of the deflector 251 is inserted into an attachment hole 241 in a posture of an improper state (similar to that of FIG. 9) that is different from a posture of a proper state (see FIG. 13) in which the deflector 251 is housed in the attachment hole 241, and also in a state in which the protrusion 255 engages with the recess 245, movement of the deflector 251 in a falling direction is restricted such that the protrusion 255 abuts against a bottom surface 245a (edge HO) of the recess 245 that is an overlapping part between the protrusion 255 and the recess 245. Therefore, the deflector 251 can be prevented from falling into the radially inner portion of the ball nut 21. In this case, the protrusion 255 and the bottom surface 245a of the recess 245 form the engagement structure.

When the deflector 251 is inserted into the attachment hole 241 in the posture of the proper state in which the deflector 251 is housed in the attachment hole 241, similarly to the first embodiment described above, the stopped surfaces 54a and 54b respectively abut against the stopping surfaces 44a and 44b formed in the attachment hole 241 substantially at the same time, thereby regulating the position of the deflector 251 in the insertion direction D. When a part of the deflector 251 is inserted into the attachment hole 241 in the posture of the improper state (similar to that of FIG. 9) that is different from the posture of the proper state in which the deflector 251 is housed in the attachment hole 241, and the protrusion 255 does not engage with the recess 245, the falling of the deflector 251 is restricted such that the protrusion 255 abuts against the outer peripheral surface 21b (edge HO) of the ball nut 21 that is a projected overlapping part as viewed in the insertion direction D. That is, the protrusion 255 and the outer peripheral surface 21b (edge HO) form the engagement structure.

Figure 14:
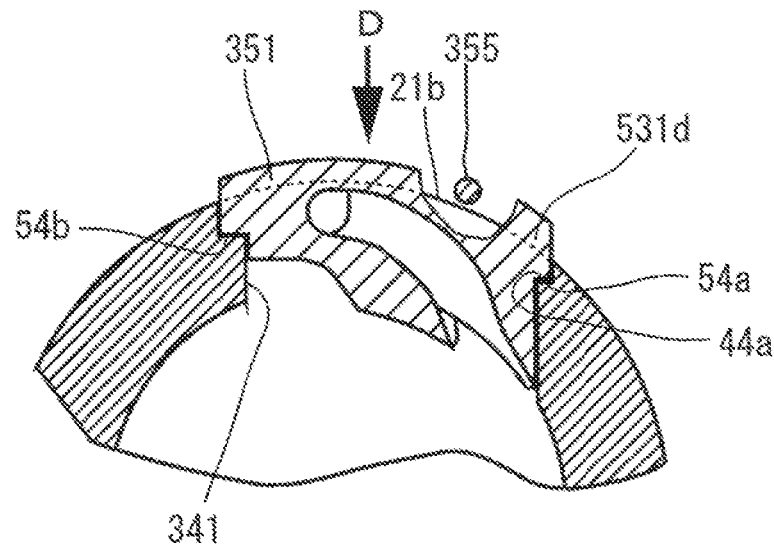
FIG. 14 is a view corresponding to FIG. 5, for describing Modified Example 3.

As Modified Example 3, the recess 45 may be omitted. In this case, a protrusion 355 is provided on a second face 531b of a deflector 351 at a peripheral edge adjacent to an outer peripheral surface 531d of the deflector 351 (FIG. 14). For example, the protrusion 355 is formed into a shape similar to but smaller than the shape (hemispherical shape) of the protrusion 255 of Modified Example 2. When the deflector 351 is housed in and fixed to an attachment hole 341, the protrusion 355 is arranged on a radially outer side of the outer peripheral surface 21b of the ball nut 21 with a clearance so as not to be brought into contact with the outer peripheral surface 21b. Therefore, small steps are present between the outer peripheral surface 21b of the ball nut 21 and the outer peripheral surface 531d of the deflector 351.

When a part of the deflector 351 is inserted into the attachment hole 341 in a posture of an improper state (not illustrated) that is different from a posture of a proper state (see FIG. 14) in which the deflector 351 is housed in the attachment hole 341, and the operator releases his/her hand from the deflector 351 in the improper state, movement of the deflector 351 in a falling direction is restricted such that the protrusion 355 abuts against the outer peripheral surface 21b (edge HO) of the ball nut 21 that is an overlapping part as viewed in the insertion direction D. That is, the protrusion 355 and the outer peripheral surface 21b (edge HO) form the engagement structure.

In the first embodiment described above, the deflector 51 is fixed to the attachment hole 41 by the press fitting between the frictionally locked surfaces 511e, 511e, 511f, and 511f and the frictionally locking surfaces 411e, 411e, 411f, and 411f. The present invention is not limited to this structure. As Modified Example 4, the deflector 51 may be fixed to the attachment hole 41 by caulking (not illustrated) after the deflector 51 is inserted into the attachment hole 41.

Figure 15:
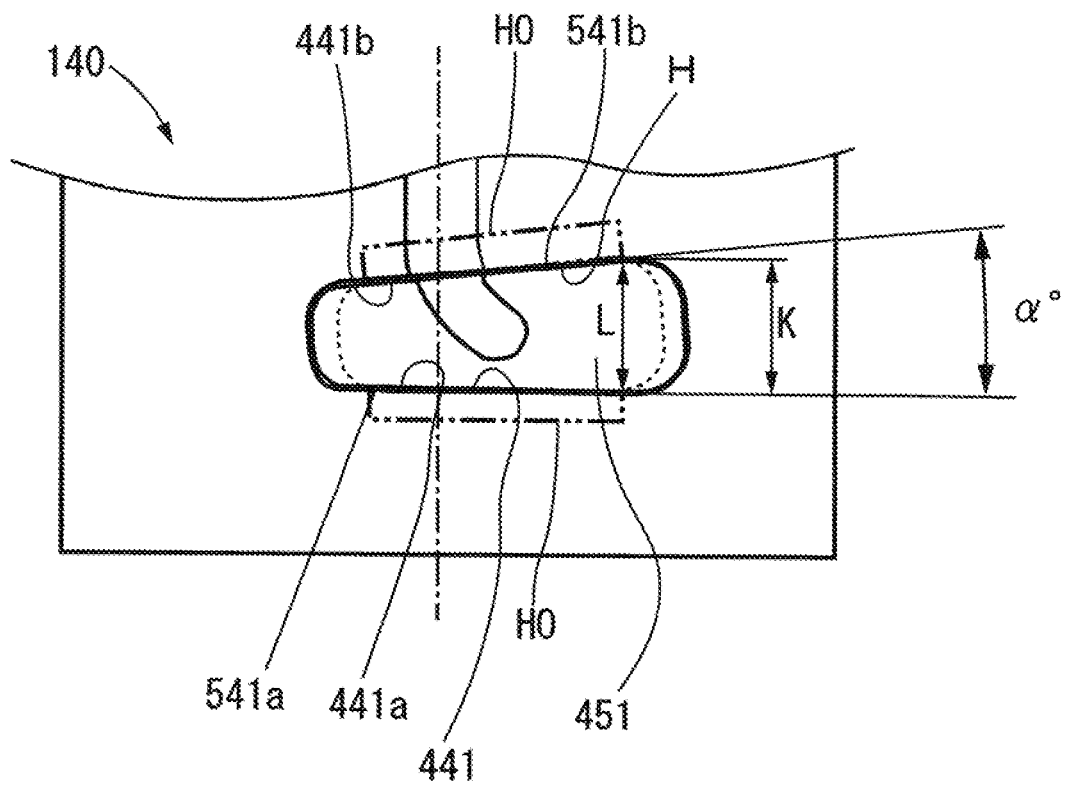
FIG. 15 is a view corresponding to FIG. 3, for describing a second embodiment.

Next, a second embodiment is described with reference to FIG. 15. A ball screw device 140 of the second embodiment is different from the ball screw device 40 of the first embodiment in terms of the shape of an attachment hole 441 and the outer shape of a deflector 451. Therefore, different features are only described, and description of similar features is omitted. Similar components are described by using the same reference symbols.

Specifically, a pair of first faces 441a and 441b of the attachment hole 441 and a pair of second faces 541a and 541b of the deflector 451 have no protrusion and recess. The first faces 441a and 441b are formed at a predetermined angle α° therebetween in the longitudinal direction. The second faces 541a and 541b are also formed at the predetermined angle α° therebetween in the longitudinal direction. The predetermined angle α° may be any angle. For example, the predetermined angle α° may be 5 deg.

Thus, a width K of a widest part between the second faces 541a and 541b as viewed in the insertion direction D is larger than a width L of a widest part of the through hole portion H (K>L). Therefore, even if a part of the deflector 451 is inserted into the attachment hole 441 in a posture of an improper state (not illustrated) that is different from a posture of a proper state in which the deflector 451 is housed in the attachment hole 441, and the operator releases his/her hand from the deflector 451 in the improper state, a part of the deflector 451 that overlaps the edges HO of the through hole portion H (outer peripheral surface 21b of the ball nut 21) securely interferes with the edges HO to prevent the deflector 451 from falling through the through hole portion H. That is, the part of the deflector 451 and the outer peripheral surface 21b of the ball nut 21 form the engagement structure. Thus, effects similar to those of the embodiment described above can be attained. The man-hour for reattachment is reduced, and therefore the ball screw device can be manufactured at low cost.

Figure 16A:
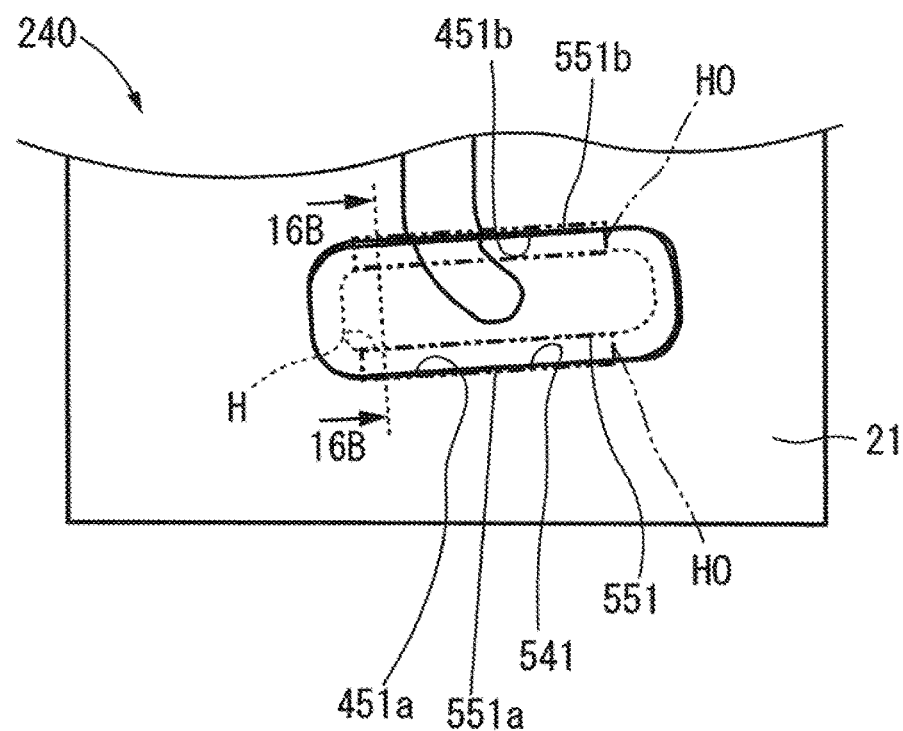
FIG. 16A is a view corresponding to FIG. 3, for describing a third embodiment.
Figure 16B:
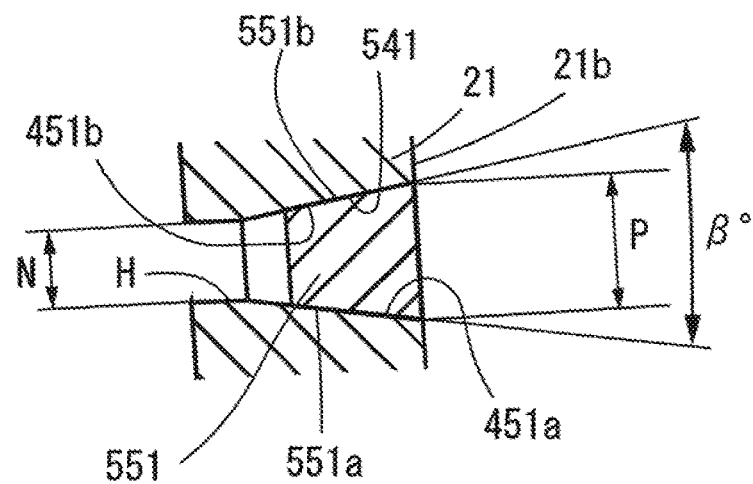
FIG. 16B is a sectional view taken along a line 16B-16B and viewed in a direction of arrows in FIG. 16A.

Next, a third embodiment is described with reference to FIG. 16A and FIG. 16B. A ball screw device 240 of the third embodiment is different from the ball screw device 40 of the first embodiment in terms of the shape of an attachment hole 541 and the outer shape of a deflector 551. Therefore, different features are only described, and description of similar features is omitted. Similar components are described by using the same reference symbols.

Specifically, a pair of first faces 451a and 451b of the attachment hole 541 and a pair of second faces 551a and 551b of the deflector 551 have no protrusion and recess similarly to the second embodiment. The first faces 451a and 451b are formed at a predetermined angle β° therebetween in the radial direction so that the width between the first faces 451a and 451b gradually decreases toward the radially inner side of the ball nut 21 (nut) (see FIG. 16B). The second faces 551a and 551b are also formed at the predetermined angle β° therebetween in the radial direction so that the width between the second faces 551a and 551b gradually decreases toward the radially inner side of the ball nut 21 (nut) (see FIG. 16B). The predetermined angle β° may be any angle. For example, the predetermined angle β° may be 5 deg.

Thus, a width P between the second faces 551a and 551b on the outer peripheral surface of the deflector 551 is larger than a minimum width N between the first faces 451a and 451b of the attachment hole 541 (P>N). Therefore, even if a part of the deflector 551 is inserted into the attachment hole 541 in a posture of an improper state (not illustrated) that is different from a posture of a proper state in which the deflector 551 is housed in the attachment hole 541, and the operator releases his/her hand from the deflector 551 in the improper state, a part of the deflector 551 that overlaps the edges HO of the through hole portion H (FIG. 16A; see long dashed double-short dashed lines) securely interferes with the edges HO to prevent the deflector 551 from falling. That is, the part of the deflector 551 and the first faces 451a and 451b of the attachment hole 541 form the engagement structure. Thus, effects similar to those of the embodiments described above can be attained. The man-hour for reattachment is reduced, and therefore the ball screw device can be manufactured at low cost.

According to each of the embodiments described above, the ball screw device 40, 140, or 240 includes the steering operation shaft 20 (ball screw shaft), the ball nut 21 (nut), the rolling balls 24 (rolling elements), the ball recirculation path R2, and the deflector 51, 151, 251, 351, 451, or 551. The steering operation shaft 20 has the outer peripheral ball rolling track 20a helically formed on the outer peripheral surface. The ball nut 21 is formed into a tubular shape, has the inner peripheral ball rolling track 21a helically formed on the inner peripheral surface, and has the attachment hole 41, 141, 241, 341, 441, or 541 passing through a portion between the outer peripheral surface 21b and the inner peripheral surface. The rolling balls 24 are arrayed in a rollable manner in the ball rolling path R1 formed between the outer peripheral ball rolling track 20a and the inner peripheral ball rolling track 21a. The ball recirculation path R2 bridges two predetermined points in the ball rolling path R1 to allow the rolling balls 24 (rolling elements) to endlessly circulate in the ball rolling path R1. The deflector 51, 151, 251, 351, 451, or 551 is fixed while being housed in the attachment hole 41, 141, 241, 341, 441, or 541, and includes a part or all of the ball recirculation path R2.

The attachment hole 41, 141, 241, 341, 441, or 541 has the pair of first faces 411a and 411b, 421a and 421b, 441a and 441b, or 451a and 451b formed so as to face each other in the axial direction of the ball nut 21 (nut) and so that the extending length in the circumferential direction of the outer peripheral surface 21b of the ball nut 21, which is the longitudinal direction, is larger than the facing distance. The deflector 51, 151, 251, 351, 451, or 551 has the pair of second faces 511a and 511b, 521a and 521b, 541a and 541b, or 551a and 551b that respectively face the pair of first faces 411a and 411b, 421a and 421b, 441a and 441b, or 451a and 451b in the state in which the deflector 51, 151, 251, 351, 451, or 551 is housed in the attachment hole 41, 141, 241, 341, 441, or 541.

The first faces 411a and 411b, 421a and 421b, 441a and 441b, or 451a and 451b of the attachment hole 41, 141, 241, 341, 441, or 541 and the second faces 511a and 511b, 521a and 521b, 541a and 541b, or 551a and 551b of the deflector 51, 151, 251, 351, 451, or 551 have the locking structure in which the first faces 411a and 411b, 421a and 421b, 441a and 441b, or 451a and 451b and the second faces 511a and 511b, 521a and 521b, 541a and 541b, or 551a and 551b respectively lock each other in the improper state in which a part of the deflector 51, 151, 251, 351, 451, or 551 is inserted into the attachment hole 41, 141, 241, 341, 441, or 541 in the posture different from the posture of the deflector 51, 151, 251, 351, 451, or 551 housed in the attachment hole 41, 141, 241, 341, 441, or 541.

As described above, the first faces 411a and 411b, 421a and 421b, 441a and 441b, or 451a and 451b of the attachment hole 41, 141, 241, 341, 441, or 541 and the second faces 511a and 511b, 521a and 521b, 541a and 541b, or 551a and 551b of the deflector 51, 151, 251, 351, 451, or 551 have the locking structure in which the first faces 411a and 411b, 421a and 421b, 441a and 441b, or 451a and 451b and the second faces 511a and 511b, 521a and 521b, 541a and 541b, or 551a and 551b respectively lock each other in the improper state in which a part of the deflector 51, 151, 251, 351, 451, or 551 is inserted into the attachment hole 41, 141, 241, 341, 441, or 541 in the posture different from the posture of the deflector 51, 151, 251, 351, 451, or 551 housed in the attachment hole 41, 141, 241, 341, 441, or 541. Therefore, even if the deflector 51, 151, 251, 351, 451, or 551 is caused to fall toward the inner peripheral surface of the ball nut 21 (nut) from the side of the outer peripheral surface 21b of the nut through the through hole portion H of the attachment hole 41, 141, 241, 341, 441, or 541, the locking structure restricts the falling of the deflector 51, 151, 251, 351, 451, or 551. Thus, the man-hour for reattachment is reduced, and therefore the ball screw device can be manufactured at low cost.

According to each of the embodiments described above, the second face 511a or 511b of the deflector 51, 251, or 351 has the protrusion 55, 255, or 355 lockable on the first face 411a or 411b of the attachment hole 41, 241, or 341 in the improper state. And the first face 421b or 421a of the attachment hole 141 has the protrusion 155 lockable on the second face 521b or 521a of the deflector 151 in the improper state. Such a simple protrusion 55, 255, or 355 can prevent the deflector 51, 251, or 351 from falling. Thus, the cost can be reduced.

According to each of the embodiments described above, the first face 411b of the attachment hole 41 or 241, which faces the protrusion 55 or 255 in the state in which the deflector 51 or 251 is housed in the attachment hole 41 or 241, has the recess 45 or 245 engageable with the protrusion 55 or 255. The recess 45 or 245 is open to the outer peripheral surface 21b of the ball nut 21 (nut).

As described above, the protrusion 55 or 255 provided in order to prevent the deflector 51 or 251 from falling engages with the recess 45 or 245. Therefore, when the deflector 51 or 251 is attached to the attachment hole 41 or 241, the deflector 51 or 251 can be guided in the insertion direction D. Thus, prevention of falling of the deflector 51 or 251 and accurate attachment of the deflector 51 or 251 can be achieved at the same time.

According to each of the embodiments described above, the first face 421b of the attachment hole 141 has the protrusion 155 lockable on the second face 521b of the deflector 151 in the improper state. Such a simple protrusion 155 can prevent the deflector 151 from falling. Thus, the cost can be reduced.

According to each of the embodiments described above, the second face 521b of the deflector 151, which faces the protrusion 155 in the state in which the deflector 151 is housed in the attachment hole 141, has the recess 145 engageable with the protrusion 155. The recess 145 is open to the inner peripheral surface of the deflector 151. Thus, prevention of falling of the deflector 151 and accurate attachment of the deflector 151 can be achieved at the same time.

According to each of the embodiments described above, the protrusion 55 or 155 is formed into a rail shape (semicircular column shape) so as to be parallel to the insertion direction of the deflector 51 or 151 in the proper state in which the deflector 51 or 151 is inserted into the attachment hole 41 or 141 in the posture of the deflector 51 or 151 housed in the attachment hole 41 or 141. The recess 45 or 145 is formed so as to guide the deflector 51 or 151 in the insertion direction D by engaging with the protrusion 55 or 155 having the rail shape (semicircular column shape) when the deflector 51 or 151 is inserted into the attachment hole 41 or 141 in the proper state.

As described above, the protrusion 55 or 155 provided in order to prevent the deflector 51 or 151 from falling has the semicircular column shape (rail shape) and engages with the recess 45 or 145. Therefore, when the deflector 51 or 151 is inserted into and attached to the attachment hole 41 or 141 in the proper state, the deflector 51 or 151 can be guided in the insertion direction D more accurately. Thus, prevention of falling of the deflector 51 or 151 and more accurate attachment of the deflector 51 or 151 can be achieved at the same time.

According to each of the embodiments described above, the pair of first faces 411a and 411b of the attachment hole 41 are formed parallel to each other, and the pair of second faces 511a and 511b of the deflector 51 are formed parallel to each other. The ends of the pair of first faces 411a and 411b in the longitudinal direction include the frictionally locking surfaces 411e, 411e, 411f, and 411f. The ends of the pair of second faces 511a and 511b in the longitudinal direction include the frictionally locked surfaces 511e, 511e, 511f, and 511f. In the state in which the deflector 51 is housed in the attachment hole 41, the frictionally locking surfaces 411e, 411e, 411f, and 411f of the attachment hole 41 are respectively fitted with interferences to the frictionally locked surfaces 511e, 511e, 511f, and 511f of the deflector 51, which respectively face the frictionally locking surfaces 411e, 411e, 411f, and 411f.

The first flat surface 411g between the frictionally locking surfaces 411e and 411e provided at the ends of the first face 411a in the longitudinal direction is fitted with a clearance to the second flat surface 511g between the frictionally locked surfaces 511e and 511e provided at the ends of the second face 511a that faces the first face 411a. The first flat surface 411h between the frictionally locking surfaces 411f and 411f provided at the ends of the first face 411b in the longitudinal direction is fitted with a clearance to the second flat surface 511h between the frictionally locked surfaces 511f and 511f provided at the ends of the second face 511b that faces the first face 411b.

As described above, the fitting portions (press-fitting portions) between the attachment hole 41 and the deflector 51 are provided at the two respective ends of the pair of first faces 411a and 411b of the attachment hole 41 and at the two respective ends of the pair of second faces 511a and 511b of the deflector 51. It is necessary that the frictionally locking surfaces of the attachment hole 41 and the frictionally locked surfaces of the deflector 51 be subjected to finishing that takes a long processing time. By reducing the lengths of the frictionally locking surfaces, the time required for the finishing is shortened, and therefore the processing cost is reduced. When the deflector 51 is press-fitted to the attachment hole 41, the fitting lengths of the press-fitting portions are small, thereby reducing the sensitivity of variations in press-fitting load to variations in interferences due to dimensional variations of the deflector 51 and the attachment hole 41. Thus, it is possible to relax dimensional tolerances of the deflector 51 and the attachment hole 41.

It is not necessary that the directions of the second faces 511a and 511b of the deflector 51 and the first faces 411a and 411b of the attachment hole 41 coincide with the direction of the inner peripheral ball rolling track 21a of the ball nut 21. For example, the second faces 511a and 511b and the first faces 411a and 411b may be arranged perpendicular to the axis of the ball nut 21.

According to each of the embodiments described above, the steering system 10 includes the ball screw device 40, 140, or 240 of each of the embodiments described above. Thus, it is possible to obtain a low-cost steering system including a low-cost ball screw device.

What is claimed is:

1. A ball screw device, comprising:
a ball screw shaft having an outer peripheral ball rolling track helically formed on an outer peripheral surface;
a nut formed into a tubular shape, having an inner peripheral ball rolling track helically formed on an inner peripheral surface, and having an attachment hole passing through a portion between an outer peripheral surface and the inner peripheral surface;
rolling elements arrayed in a rollable manner in a ball rolling path formed between the outer peripheral ball rolling track and the inner peripheral ball rolling track;
a ball recirculation path that bridges two predetermined points in the ball rolling path to allow the rolling elements to endlessly circulate in the ball rolling path; and
a deflector fixed while being housed in the attachment hole, the deflector including a part or all of the ball recirculation path, wherein
the attachment hole has a pair of first faces formed so as to face each other in an axial direction of the nut and so that an extending length in a circumferential direction of the outer peripheral surface of the nut, which is a longitudinal direction, is larger than a facing distance of the pair of first faces,
the deflector has a pair of second faces that respectively face the pair of first faces in a state in which the deflector is housed in the attachment hole,
the first faces of the attachment hole and the second faces of the deflector have a locking structure in which the first faces and the second faces respectively lock each other in an improper state in which a part of the deflector is inserted into the attachment hole in a posture different from a posture of the deflector housed in the attachment hole,
the pair of first faces of the attachment hole are formed parallel to each other, and the pair of second faces of the deflector are formed parallel to each other,
ends of the pair of first faces in the longitudinal direction include frictionally locking surfaces,
ends of the pair of second faces in the longitudinal direction include frictionally locked surfaces, and
in the state in which the deflector is housed in the attachment hole,
the frictionally locking surfaces of the attachment hole respectively face the frictionally locked surfaces of the deflector, and are respectively press-fitted, with interference, to the frictionally locked surfaces, and
first flat surfaces of the attachment hole are present between the frictionally locking surfaces in the longitudinal direction, second flat surfaces of the deflector are present between the frictionally locked surfaces, the first flat surfaces respectively face the second flat surfaces, and clearances are present between the first flat surfaces and the second flat surfaces.

2. The ball screw device according to claim 1, wherein the second face of the deflector has a protrusion lockable on the first face of the attachment hole in the improper state.

3. The ball screw device according to claim 2, wherein the first face of the attachment hole, which faces the protrusion in the state in which the deflector is housed in the attachment hole, has a recess engageable with the protrusion, and the recess is open to the outer peripheral surface of the nut.

4. The ball screw device according to claim 3, wherein
the protrusion is formed into a rail shape so as to be parallel to an insertion direction of the deflector in a proper state in which the deflector is inserted into the attachment hole in the posture of the deflector housed in the attachment hole, and
the recess is formed so as to guide the deflector in the insertion direction by engaging with the protrusion having the rail shape when the deflector is inserted into the attachment hole in the proper state.

5. The ball screw device according to claim 2, wherein the ball recirculation path opens at one of the second faces of the deflector, at a position separated from the protrusion.

6. The ball screw device according to claim 1, wherein the first face of the attachment hole has a protrusion lockable on the second face of the deflector in the improper state.

7. The ball screw device according to claim 6, wherein
the second face of the deflector, which faces the protrusion in the state in which the deflector is housed in the attachment hole, has a recess engageable with the protrusion, and
the recess is open to an inner peripheral surface of the deflector.

8. The ball screw device according to claim 1, wherein
the pair of first faces of the attachment hole are formed at a predetermined angle therebetween in the longitudinal direction, and
the pair of second faces of the deflector are formed at the predetermined angle therebetween in the longitudinal direction.

9. The ball screw device according to claim 1, wherein
the pair of first faces of the attachment hole are formed at a predetermined angle therebetween in a radial direction so that a width between the pair of first faces gradually decreases toward a radially inner side of the nut, and
the pair of second faces of the deflector are formed at the predetermined angle therebetween in the radial direction so that a width between the pair of second faces gradually decreases toward the radially inner side of the nut.

10. A steering system, comprising the ball screw device according to claim 1.

11. The ball screw device according to claim 1, wherein the locking structure includes a protrusion that curves over its entire width, as viewed in an insertion direction of the deflector in a proper state in which the deflector is inserted into the attachment hole.

12. The ball screw device according to claim 1, wherein the ball recirculation path opens at one of the second faces of the deflector, at a position separated from the locking structure.

13. A ball screw device, comprising:
a ball screw shaft having an outer peripheral ball rolling track helically formed on an outer peripheral surface;
a nut formed into a tubular shape, having an inner peripheral ball rolling track helically formed on an inner peripheral surface, and having an attachment hole passing through a portion between an outer peripheral surface and the inner peripheral surface;
rolling elements arrayed in a rollable manner in a ball rolling path formed between the outer peripheral ball rolling track and the inner peripheral ball rolling track;

a ball recirculation path that bridges two predetermined points in the ball rolling path to allow the rolling elements to endlessly circulate in the ball rolling path; and a deflector fixed while being housed in the attachment hole, the deflector including a part or all of the ball recirculation path, wherein the attachment hole has a pair of first faces formed so as to face each other in an axial direction of the nut and so that an extending length in a circumferential direction of the outer peripheral surface of the nut, which is a longitudinal direction, is larger than a facing distance of the pair of first faces, the deflector has a pair of second faces that respectively face the pair of first faces in a state in which the deflector is housed in the attachment hole, the first faces of the attachment hole and the second faces of the deflector have a locking structure in which the first faces and the second faces respectively lock each other in an improper state in which a part of the deflector is inserted into the attachment hole in a posture different from a posture of the deflector housed in the attachment hole, the locking structure including a protrusion that curves over its entire width, as viewed in an insertion direction of the deflector in a proper state in which the deflector is inserted into the attachment hole, the pair of first faces of the attachment hole are formed parallel to each other, and the pair of second faces of the deflector are formed parallel to each other, ends of the pair of first faces in the longitudinal direction include frictionally locking surfaces, ends of the pair of second faces in the longitudinal direction include frictionally locked surfaces, and in the state in which the deflector is housed in the attachment hole, the frictionally locking surfaces of the attachment hole respectively face the frictionally locked surfaces of the deflector, and are respectively fitted, with interference, to the frictionally locked surfaces, and first flat surfaces of the attachment hole are present between the frictionally locking surfaces in the longitudinal direction, second flat surfaces of the deflector are present between the frictionally locked surfaces, the first flat surfaces respectively face the second flat surfaces, and clearances are present between the first flat surfaces and the second flat surfaces.

* * * * *